US 6,915,253 B1

(12) United States Patent
Chapman

(10) Patent No.: US 6,915,253 B1
(45) Date of Patent: Jul. 5, 2005

(54) METHOD FOR FACILITATING PRODUCT CONFIGURATION USING COMPONENTS FROM A SET

(75) Inventor: Barry L. Chapman, Mesquite, TX (US)

(73) Assignee: Fujitsu Limited, Kawasaki (JP)

( * ) Notice: Subject to any disclaimer, the term of this patent is extended or adjusted under 35 U.S.C. 154(b) by 783 days.

(21) Appl. No.: 09/662,366

(22) Filed: Sep. 13, 2000

(51) Int. Cl.⁷ .............................................. G06F 9/45
(52) U.S. Cl. ........................... 703/22; 703/20; 703/21; 709/245; 713/100; 705/26
(58) Field of Search ................... 703/22, 21, 20, 703/13; 709/245; 713/100; 705/26

(56) References Cited

U.S. PATENT DOCUMENTS

| | | | |
|---|---|---|---|
| 4,591,983 A | 5/1986 | Bennett et al. ............. 364/403 |
| 5,257,387 A | 10/1993 | Richek et al. .............. 395/800 |
| 5,283,857 A | 2/1994 | Simoudis ..................... 395/77 |
| 5,428,791 A | 6/1995 | Andrew et al. ............. 395/700 |
| 5,515,524 A | 5/1996 | Lynch et al. ................ 395/500 |
| 5,850,539 A | * 12/1998 | Cook et al. .................... 703/20 |
| 5,870,719 A | * 2/1999 | Maritzen et al. .............. 705/26 |
| 6,002,854 A | 12/1999 | Lynch et al. ........... 395/500.01 |
| 6,247,128 B1 | * 6/2001 | Fisher et al. ................ 713/100 |
| 6,647,428 B1 | * 11/2003 | Bannai et al. ............... 709/245 |
| 2002/0029170 A1 | 3/2002 | Gasser et al. ................. 705/26 |
| 2002/0035463 A1 | * 3/2002 | Lynch et al. .................. 703/21 |

OTHER PUBLICATIONS

Deang, "IFsys: An integrated framework for system level synthesis", IEEE Apr. 1998.*
Mori et al. "Computer hardware configuration expert system: Examination of its software reliability", IEEE, Mar. 1993.*
Iizuka et al., "A computer system configurable design expert system", IEEE, May 1988.*

* cited by examiner

Primary Examiner—Kevin J. Teska
Assistant Examiner—Kandasamy Thangavelu
(74) Attorney, Agent, or Firm—Baker Botts L.L.P.

(57) ABSTRACT

A method is provided to facilitate configuration of one of a plurality of different products from a set of components (TABLE 2) which can be selectively combined in different ways to form a plurality of different component combinations that each serve as a respective one of the products. An inventory list is prepared (191, TABLE 2), and then a component information package is prepared (192, TABLE 3). A determination is then made (193, TABLE 4) as to whether each component in the inventory list corresponds to one or more of first, second and third component classes (TABLE 1) that are different. One or more criteria sets (196) are then developed to define a plurality of criteria states which each correspond to a valid combination of components from the second and/or third classes that represents a respective product. Then, a flowchart is prepared (197, FIG. 8) to diagrammatically represent the criteria set and the combinations of components which correspond to the respective states of the criteria set.

11 Claims, 18 Drawing Sheets

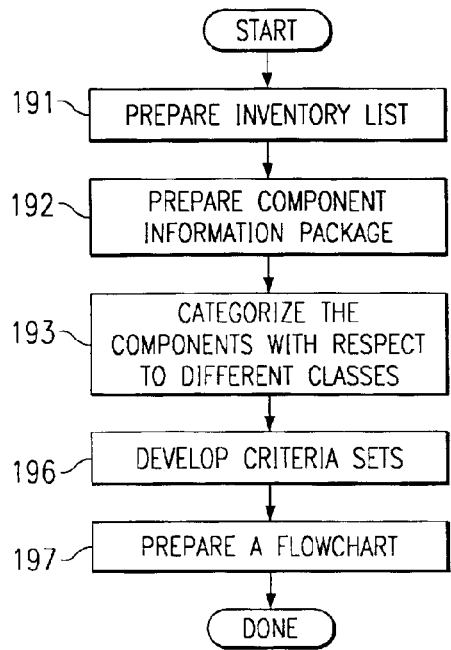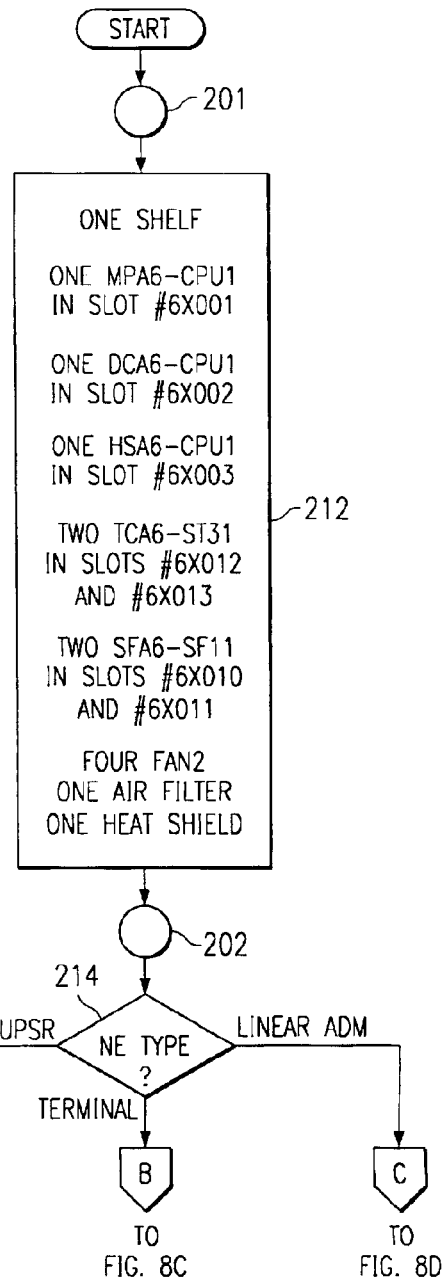

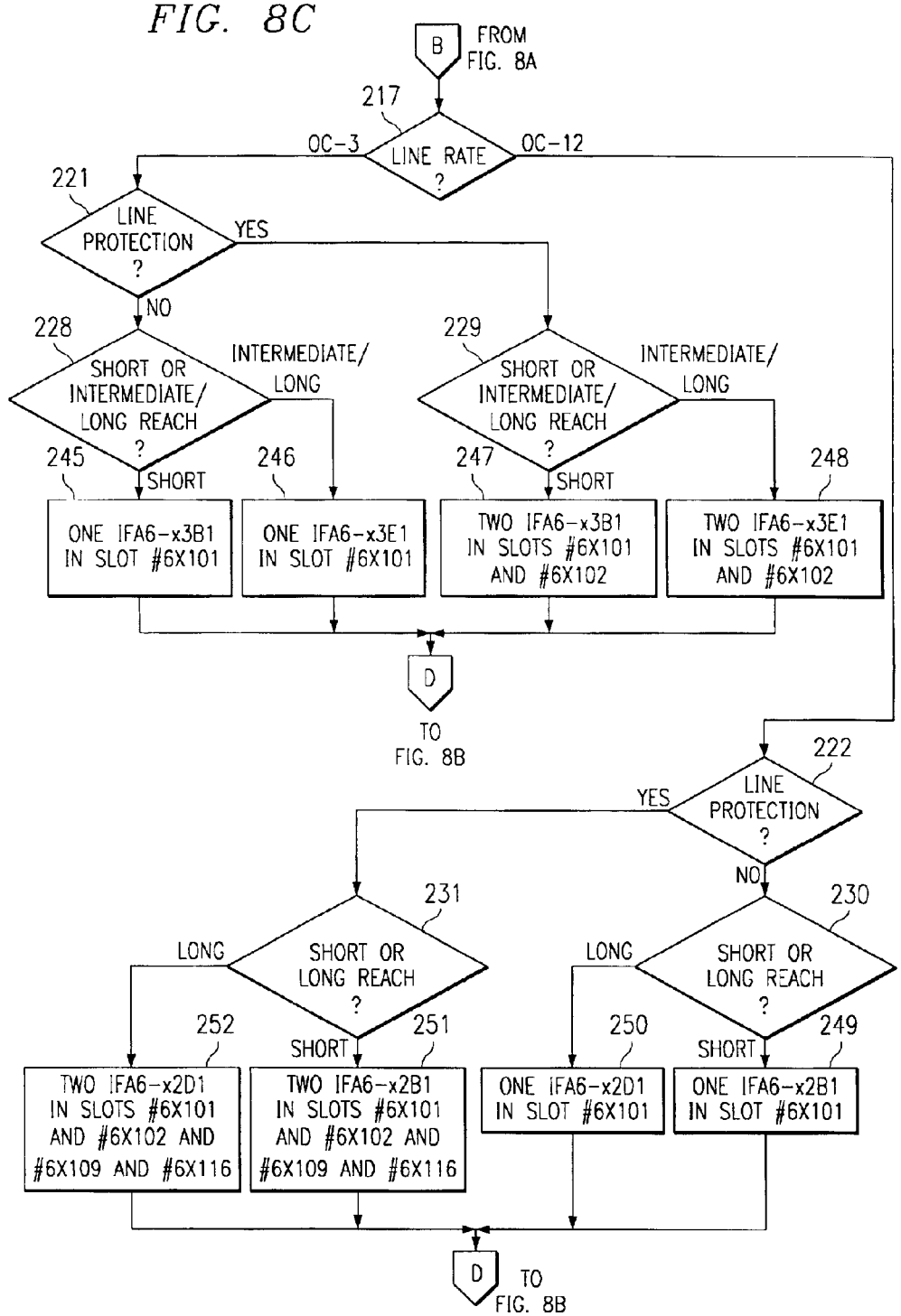

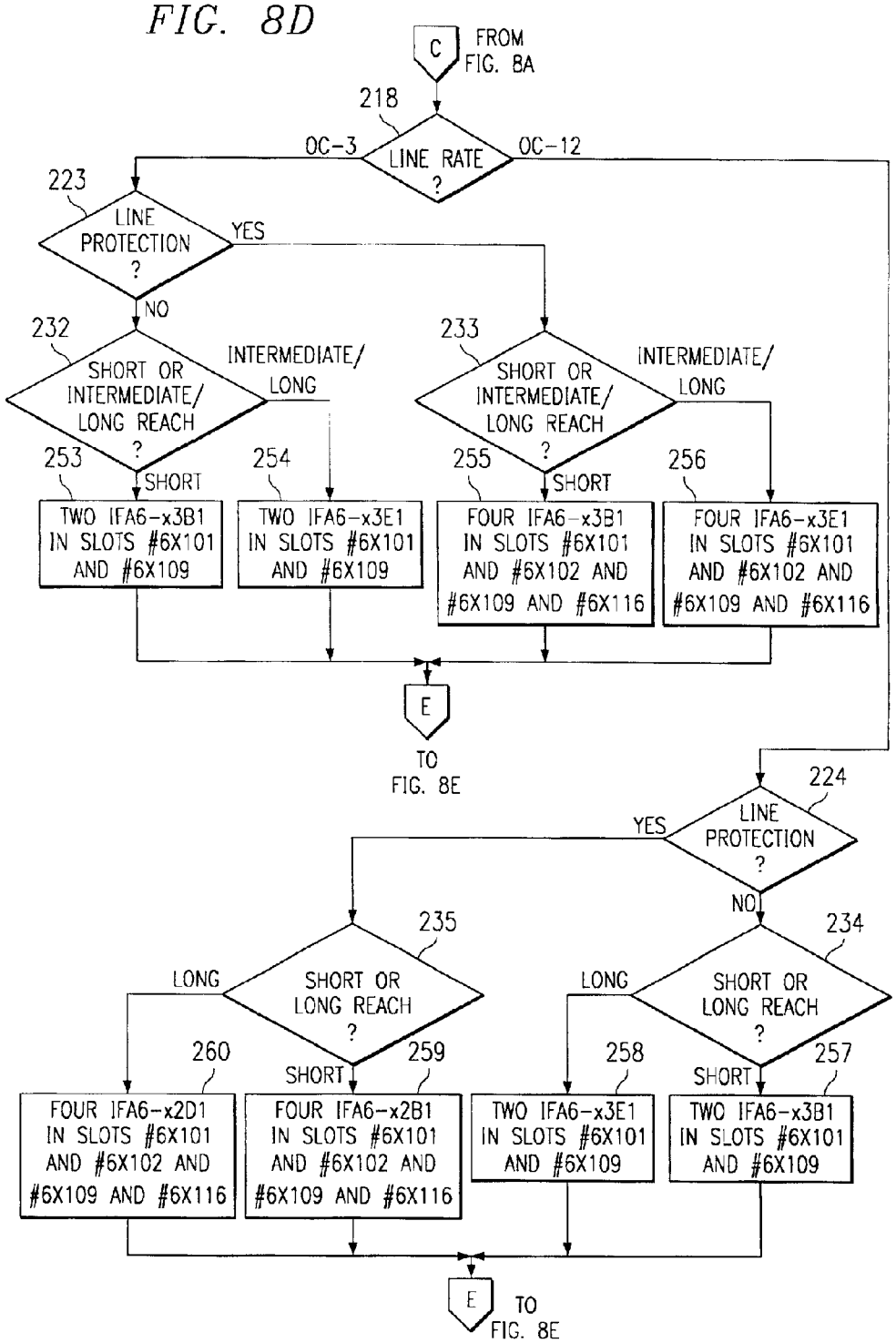

FIG. 9

| QUANTITY (x) | COMPONENTS (CLASS 2) | TYPES (n) | MATHEMATICAL COMBINATIONS | ENGINEERING RULES | CRITERIA SET | | | | | | | | |
|---|---|---|---|---|---|---|---|---|---|---|---|---|---|
| | | | | | TOPOLOGY | | | NETWORK | | | | SPAN | |
| | | | | | NETWORK ELEMENT TYPE | | | TRANSPORT RATE | | PROTECTION (TRANSPORT) | | REACH | |
| | | | | | TERM | UPSR | Ln ADM | OC-3 | OC-12 | YES | NO | SHORT | MED/LONG |
| 1,2,4 | IFA6 (TRANSPORT) | 4 | 49 | 12 | 8 | 4 | 4 | 4 | 4 | 2 | 2 | 1 | 1 |
| TOTAL | | | 49 | 12 | 8 | 4 | 4 | 4 | 4 | 2 | 2 | 1 | 1 |

FIG. 10

| QUANTITY (x) | COMPONENTS (CLASS 3) | TYPES (n) | MATHEMATICAL COMBINATIONS | ENGINEERING RULES | CRITERIA SET | | | | | | | | | |
|---|---|---|---|---|---|---|---|---|---|---|---|---|---|---|
| | | | | | DROP CAPACITY | | | | | | | | REACH | |
| | | | | | DATA INTERFACE | | TRIBUTARIES | | | 1+1 TRIBUTARY PROTECTION | | | | |
| | | | | | ATM | NONE | OC-12 | OC-3 | DS3/EC-1 | YES | NO | | SHORT | MED/LONG |
| 0,2 | APA6 | 1 | 2 | 2 | 1 | | | | | 1 | 1 | | 1 | 1 |
| 0,2 | AFA6 | 1 | 2 | 2 | | 1 | | | | 1 | 1 | | 1 | 1 |
| 0–14 | IFA6 (TRIBUTARIES) | 5 | 2.63627E+14 | 2.63627E+14 | 2.63627E+14 | 2.63627E+14 | 4 | 4 | 4 | 2 | 2 | | 1 | 1 |
| 0,1 | DS3EXT SHELF | 1 | 2 | 2 | | 1 | | | 1 | 2 | 1 | | 1 | 1 |
| TOTAL | | | 2.10902E+15 | 1.05E+15 | 2.63627E+14 | 2.63627E+14 | 4 | 4 | 4 | 2 | 2 | | 1 | 1 | ns may span a 
METHOD FOR FACILITATING PRODUCT CONFIGURATION USING COMPONENTS FROM A SET

TECHNICAL FIELD OF THE INVENTION

This invention relates in general to configuration of a product and, more particularly, to a method for facilitating configuration of one of a plurality of different products from a set of components which can be selectively combined in different ways.

BACKGROUND OF THE INVENTION

Systems are frequently developed which involve a plurality of related components that can be selectively combined in different ways to form a plurality of different products. In some situations, the total number of possible combinations of the components is astronomical, but only a subset of these combinations actually represent valid products. Even so, there can still be a relatively large number of the combinations that represent valid products.

In some situations, the manufacturer selects a small handful of the valid combinations to serve as pre-configured products that will actually be manufactured and marketed. On the other hand, there are applications in which it is desirable to give prospective purchasers the capability to obtain any of the various component combinations that represent valid products, so that each purchaser receives a product which is custom tailored to meet the needs of that purchaser's particular application. However, where the number of valid component combinations is relatively large, and/or where the product is technically complex, this can present a very difficult problem. In particular, the problem is that it is difficult for the prospective purchaser to configure a product, unless he or she first spends a substantial amount of time becoming intimately familiar with technical details of the various components and with the permissible and impermissible ways of combining them.

In order to address this problem, techniques have previously been developed to facilitate configuration of various products from a set of components. In some cases, these techniques have been incorporated into tools like computer programs, which can present one or more questions to a prospective purchaser, and then use the answers to automatically configure a product that meets the purchaser's needs.

While these existing techniques and tools have been generally adequate for their intended purposes, they have not been satisfactory in all respects. In this regard, the process of developing such a tool for any new product has traditionally been a tedious and painstaking task. Identification of an appropriate set of questions typically involves a significant amount of intelligent guessing, and trial and error experimentation. The time required to develop such a tool for any new product is substantial, and may span a number of weeks or even a number of months. In some cases, introduction of the product to the marketplace may need to be delayed until the tool is ready. Alternatively, the product may need to be introduced without the support of a suitable tool, which may adversely affect customer reaction during the crucial period of initial product introduction.

A further consideration is that, due to the complexity involved in the development process, the resulting tools may not have the full range of desired capability. For example, some valid combinations of components may be inadvertently overlooked, such that the resulting tool may not be capable of providing a purchaser with certain valid combinations of components, with the result that the purchaser receives a product that is not optimum for his or her particular application.

SUMMARY OF THE INVENTION

From the foregoing, it may be appreciated that a need has arisen for a method for facilitating configuration of products from a plurality of different components, permitting a suitable configuration procedure to be developed more rapidly and more accurately than is the case with known techniques. According to the present invention, a method is provided to address this need, and involves: determining whether each component in the set corresponds to a first component class involving components that are required in each product without variation in quantity and type; determining whether each component in the set corresponds to a second component class involving components that are required in each product but that vary among the products with respect to at least one of quantity and type; determining whether each component in the set corresponds to a third component class involving components that are each present in some but not all of the products, the components corresponding to the second and third classes collectively forming a component group; identifying a criteria set having a plurality of different states which each correspond to a respective one of the products; and associating with each state of the criteria set a definition of a combination of the components from the component group which is present in the corresponding product.

BRIEF DESCRIPTION OF THE DRAWINGS

A better understanding of the present invention will be realized from the detailed description which follows, taken in conjunction with the accompanying drawings, in which:

FIG. 7 is a flowchart showing a sequence of steps which embody one form of the present invention;

FIGS. 8A–8L is an example of a flowchart developed according to techniques which embody the present invention, and includes several separate figures that are collectively referred to herein as FIG. 8;

FIG. 9 is chart showing an analysis relating to one class of components from the apparatus of FIG. 1; and FIG. 10 is a chart showing a similar analysis relating to a different class of components from the apparatus of FIG. 1.

DETAILED DESCRIPTION OF THE INVENTION

Figure 1:
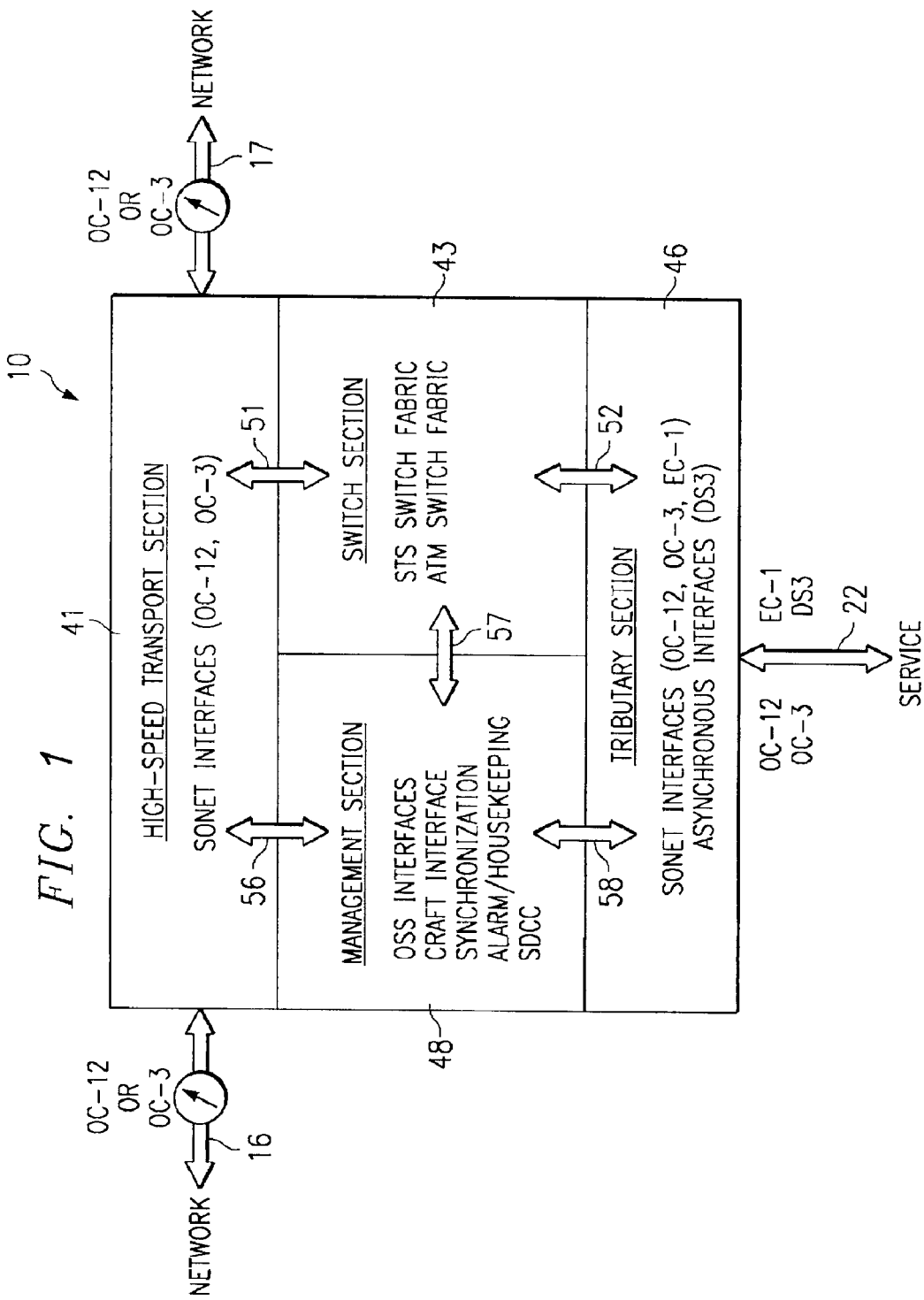
FIG. 1 is block diagram of a multiplexer apparatus which can be configured into various different products using techniques according to the present invention.

FIG. 1 is a diagrammatic view of a multiplexer apparatus 10 for a telecommunications system, to which the techniques of the present invention can be applied. For convenience, the apparatus 10 of FIG. 1 has been selected as one example of an apparatus to which the present invention can be applied. However, the present invention is not in any way limited to a telecommunications product the telecommunications field, but has application to a wide variety of other products in a wide variety of other fields.

As described in more detail below, the multiplexer apparatus 10 of FIG. 1 is associated with a set of components, which can be selectively combined in many different ways in order to form many different products. The diagram of FIG. 1 is a generic representation of the architecture that is generally common to all of these products.

Focusing in more detail on FIG. 1, the apparatus 10 has transport ports 16 and 17, which are coupled to optical fibers in a telecommunications network, and which carry high-speed telecommunications traffic. The transport ports 16 and 17 are sometimes alternatively referred to as line ports. In the disclosed embodiment, the ports 16 and 17 are configured to carry traffic conforming to the industry standard known as the synchronous optical network (SONET) protocol, and in particular either the Optical Carrier 12 (OC-12) or Optical Carrier 3 (OC-3) SONET protocols. However, it will be recognized that the transport ports 16 and 17 could alternatively be use some other existing or future communication protocol. While it is possible to use the ports 16 and 17 to couple the apparatus 10 to other equipment which is local, the ports 16 and 17 will typically be used to couple the apparatus 10 to other equipment which is at remote locations.

As is common in the industry, high priority SONET traffic is typically sent through optical fibers referred to as working fibers, whereas low priority traffic is sent through optical fibers referred to as protection fibers. The provision and use of protection fibers is known in the telecommunications industry, and therefore is described here only briefly, to the extent needed to facilitate an understanding of the present invention. In this regard, if some or all of the working fibers become unavailable, for example because they are inadvertently cut by construction equipment, the lower priority traffic on some or all protection fibers can be interrupted, and then the high priority traffic from the unavailable working fibers is switched over to the protection fibers that have been made available.

The apparatus 10 further includes a service port 22 that can be coupled to a plurality of optical fibers in a telecommunications network, which are commonly referred to as tributaries. The service port 22 is typically used to couple the apparatus 10 to other local equipment, rather than to equipment at remote locations. Telecommunications traffic flowing through the service port 22 will have a speed which is the same as or slower than the speed of telecommunications traffic flowing through the transport ports 16 and 17. In the disclosed embodiment, a wider range of communication protocols is available for the tributary ports than for the transport ports, including both synchronous and asynchronous interfaces. In particular, available synchronous interfaces for the tributary ports include the SONET OC-12 and OC-3 interfaces discussed above. A further option for a synchronous interface is the SONET protocol known in the industry as EC-1. For an asynchronous interface, the industry standard known as the DS3 protocol is available.

Internally, the multiplexer apparatus 10 has four sections with respective different functions, including a high-speed transport section 41, a switch section 43, a tributary section 46, and a management section 48. The transport section 41 includes circuitry which provides a plurality of interfaces for each of the transport ports 16 and 17. Similarly, the tributary section 46 includes circuitry which provides a plurality of tributary interfaces for the service port 22.

The switch section 43 has a switching function, and operates to dynamically establish paths that route telecommunications traffic between the various optical fibers coupled to each of the transport port 16, the transport port 17, and the service port 22. In other words, any telecommunications traffic which travels through the multiplex apparatus 10 from one of the ports 16–17 and 22 to another of these ports will flow through the switch section 43. As one example, telecommunications traffic being routed from the port 16 to the port 17 will flow through the switch section 43. This involvement of the switch section 43 with the flow of telecommunications traffic is indicated diagrammatically by the double-headed arrows 51 and 52 in FIG. 1. Depending on the configuration of the apparatus 10, the switch section 43 can include one or two different types of switching circuitry, which are each known as a switch fabric. One is a switch fabric that conforms to an industry standard known as the Synchronous Transport Signal (STS) protocol, and the other is a switch fabric that conforms to an industry standard known as the Asynchronous Transfer Mode (ATM) protocol.

The management section 48 carries out a control function with respect to each of the transport section 41, switch section 43, and a tributary section 46, as indicated diagrammatically by respective double-headed arrows 56–58. Functions implemented by the management section 48 include: interfaces known in the industry as Operational Support Systems (OSS) interfaces; a craft interface, which is a man/machine interface providing external access; synchronization control; alarm and housekeeping functions; and functionality known in the industry as Section Data Communication Channel (SDCC) support. More detail regarding the internal structure of the apparatus 10 will be presented later.

There are various different ways in which the apparatus 10 of FIG. 1 can be functionally incorporated into a telecommunications network. Three different approaches are of specific interest for purposes of explaining the present invention. In each approach, the multiplex apparatus 10 implements a different function from the point of view of the overall network. Stated differently, the apparatus 10 acts as one of three different types of network element (NE).

Figure 2:
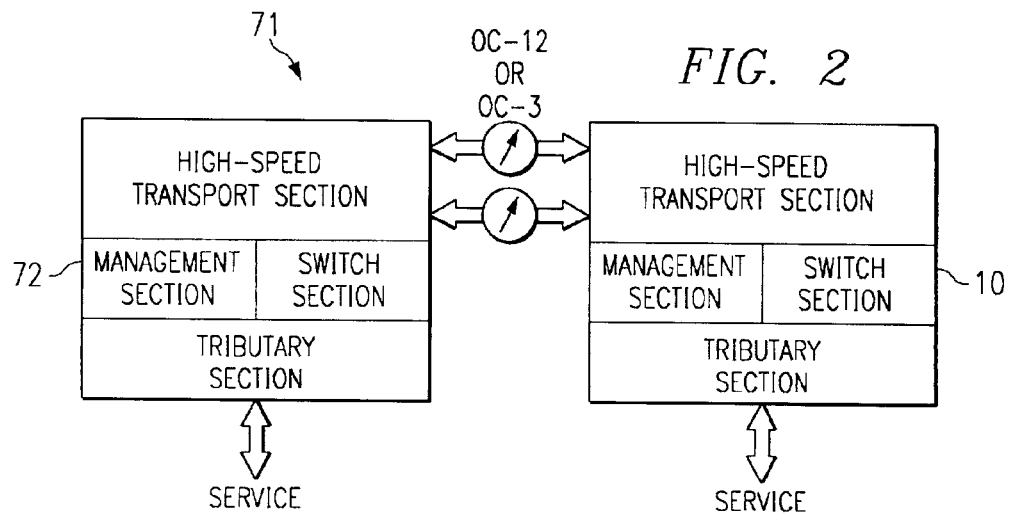
FIG. 2 is a block diagram of a system in which the apparatus of FIG. 1 is used to implement a network element known as a terminal.
Figure 3:
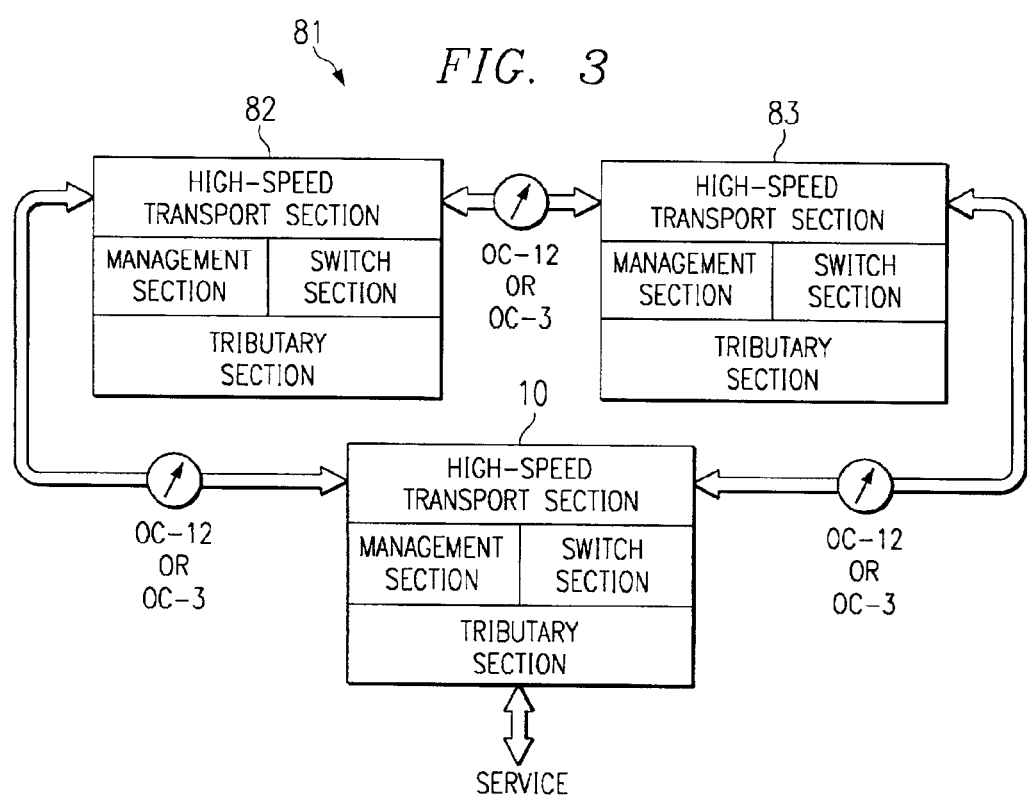
FIG. 3 is a block diagram of a system having a Unidirectional Path Switched Ring (UPSR) configuration, in which the apparatus of FIG. 1 is a UPSR network element.
Figure 4:
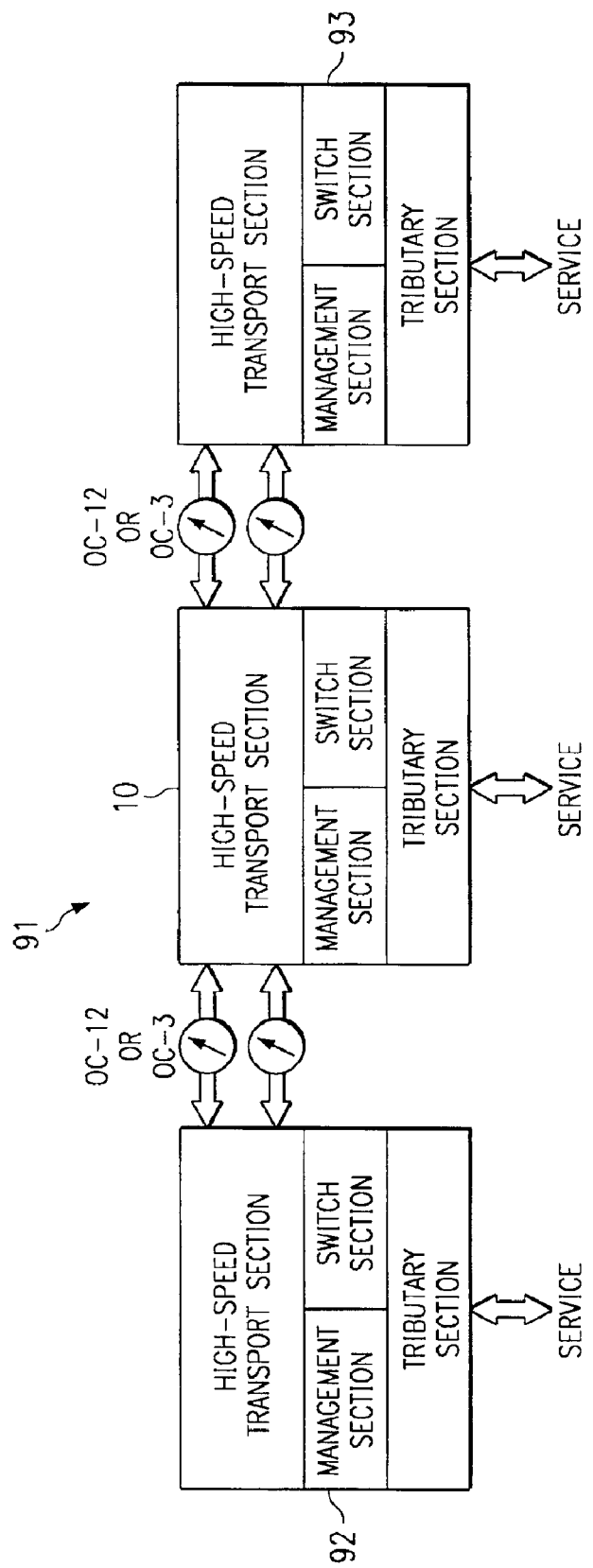
FIG. 4 is a block diagram of a system in which the apparatus of FIG. 1 is used to implement a network element known as a linear add/drop multiplexer.

In this regard, FIGS. 2–4 are diagrammatic views which each show a simple example of a respective different telecommunications network configuration representing a respective one of the three approaches of interest. In each of FIGS. 2–4, the multiplexer apparatus 10 of FIG. 1 is shown operatively coupled to one or two other devices that, for simplicity and clarity in explaining the present invention, are depicted as devices of the same type as the apparatus 10. However, these other devices could alternatively be different from the apparatus 10 of FIG. 1.

In more detail, FIG. 2 is a diagrammatic view of a network configuration 71 in which the multiplexer apparatus 10 of FIG. 1 is operatively coupled by a network to an multiplexer apparatus 72. In this network configuration, the apparatus 10 serves as a network element of a type commonly referred to in the industry as a terminal.

FIG. 3 is a diagrammatic view of a network configuration 81 in which the multiplexer apparatus 10 of FIG. 1 is operatively coupled by the network to a multiplexer apparatus 82 and a multiplexer apparatus 83. This network configuration is known in the industry as a Unidirectional Path Switched Ring (UPSR), and thus the apparatus 10 serves as a UPSR network element.

FIG. 4 is a diagrammatic view of a further network configuration 91 in which the multiplexer apparatus 10 of FIG. 1 is operatively coupled by the network to a multiplexer apparatus 92 and a multiplexer apparatus 93. In this network configuration, the apparatus 10 serves as a network element of a type commonly referred to in the industry as a Linear Add/Drop Multiplexer (Linear ADM).

Figure 5:
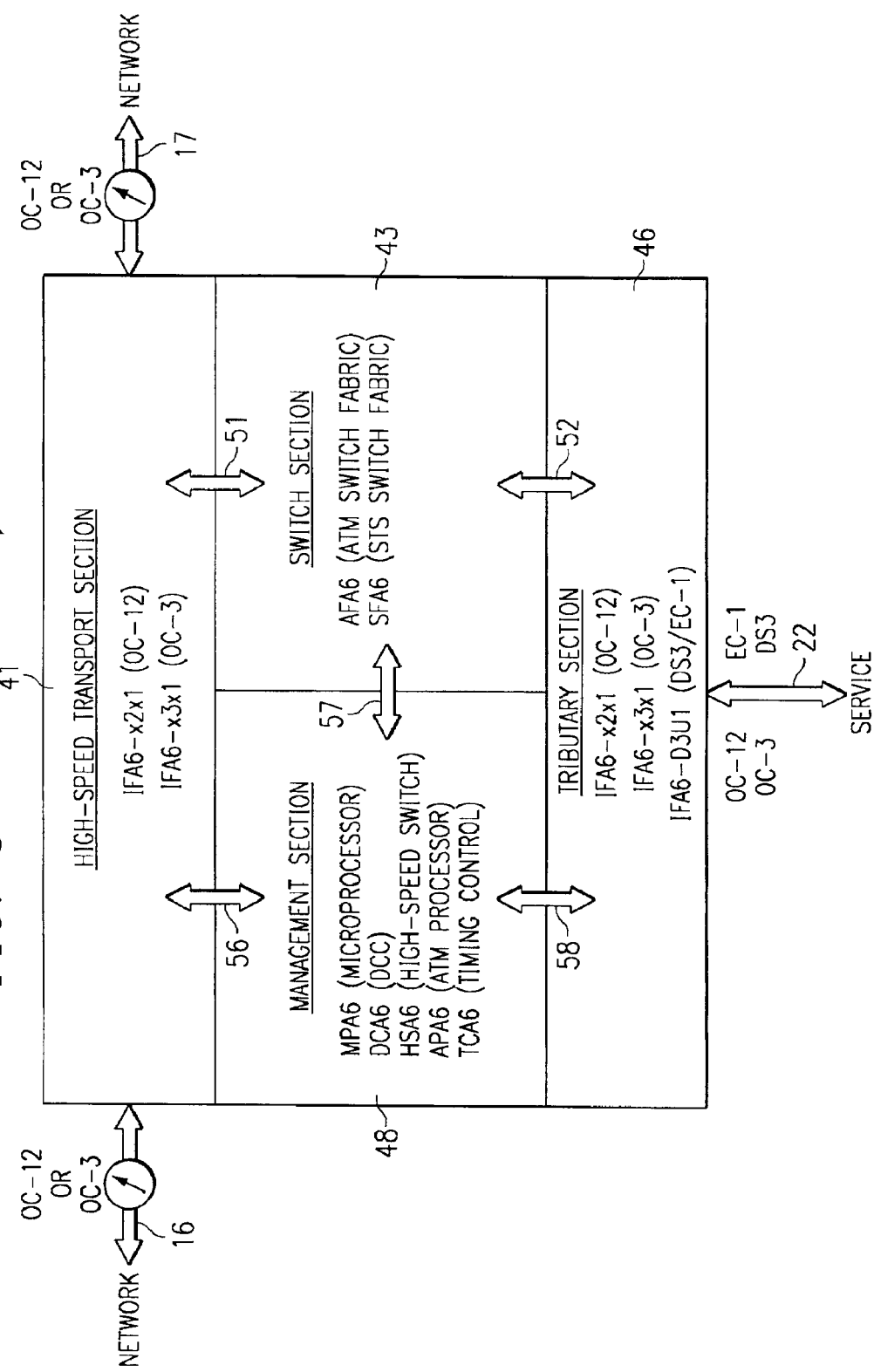
FIG. 5 is a view similar to FIG. 1, but identifying specific components which are used in each of several different sections thereof.

FIG. 5 is a diagrammatic view of the multiplexer apparatus 10, which is similar to the view of FIG. 1 except that it identifies certain specific components that can be used to implement each of the four sections 41, 43, 46 and 48 of the apparatus 10. These specific components are circuit cards. Each will be discussed in more detail later, but FIG. 5 provides an initial introduction to which of these components relate to which of the four different sections of the multiplexer apparatus 10. Some of these circuit card components will be present in every possible configuration of the apparatus 10, whereas others may or may not be present, depending on the particular configuration. This is also discussed in more detail later. For completeness, FIG. 5 identifies every circuit card component that could be present in each section, but it should be understood that not all of them will be present in every possible configuration.

In each of the transport section 41 and tributary section 46 of FIG. 5, an OC-12 interface can be implemented using a circuit card identified as an IFA6-x2x1. This circuit card has several different types, as discussed later. In a similar manner, an OC-3 interface can be implemented in either of the transport and tributary sections 41 and 46 by a circuit card identified as an IFA6-x3x1. This circuit card also has several different types. For purposes of the present invention, all of these types of circuit cards used to implement OC-12 and OC-3 interfaces are treated collectively as a single type of component, identified as an IFA6-xxx1.

If a DS3 or EC-1 interface is desired in the tributary section, then a different circuit card IFA6-D3U1 is used in the tributary section. This circuit card for implementing DS3 and EC-1 interfaces is treated as a component different from the component IFA6-xxx1 discussed above for implementing OC-12 and OC-3 interfaces. Since DS3 and EC-1 interfaces are not permitted in the transport section 41 of the disclosed embodiment, use of the IFA6-D3U1 component in the transport section 41 is not an option.

In order to effect switching of STS traffic within the switch section 43, a circuit card component SFA6 is used to implement the STS switch fabric. If a data interface is to be implemented, or in other words if the switch section 43 is to be capable of switching ATM traffic, then a circuit card component AFA6 is used in the switch section 43 in order to implement an ATM switch fabric.

The management section 48 includes a circuit card component identified as MPA6, which provides microprocessor capability. The management section 48 further includes a circuit card component DCA6 that provides what is known in the industry as Data Communications Channel (DCC) capability, and a circuit card component HSA6 that provides switching control when protection is implemented in the apparatus 10. The management section 48 also includes a circuit card component TCA6, which provides timing control for the apparatus 10. If the switch section 43 has ATM switching capability, in particular through use of the component AFA6 as discussed above, then a circuit card component APA6 is provided in the management section 48, and has an ATM processor which provides control that facilitates the ATM switching function.

As mentioned above, the components discussed in association with FIG. 5 are each a circuit card. While FIG. 5 highlights each component which is a circuit card, the multiplexer apparatus 10 also includes other components, such as mechanical parts, which will now be discussed in association with FIG. 6. More specifically, FIG. 6 is a diagrammatic elevational front view of the multiplexer apparatus 10, showing more structural detail than FIG. 1.

Figure 6:
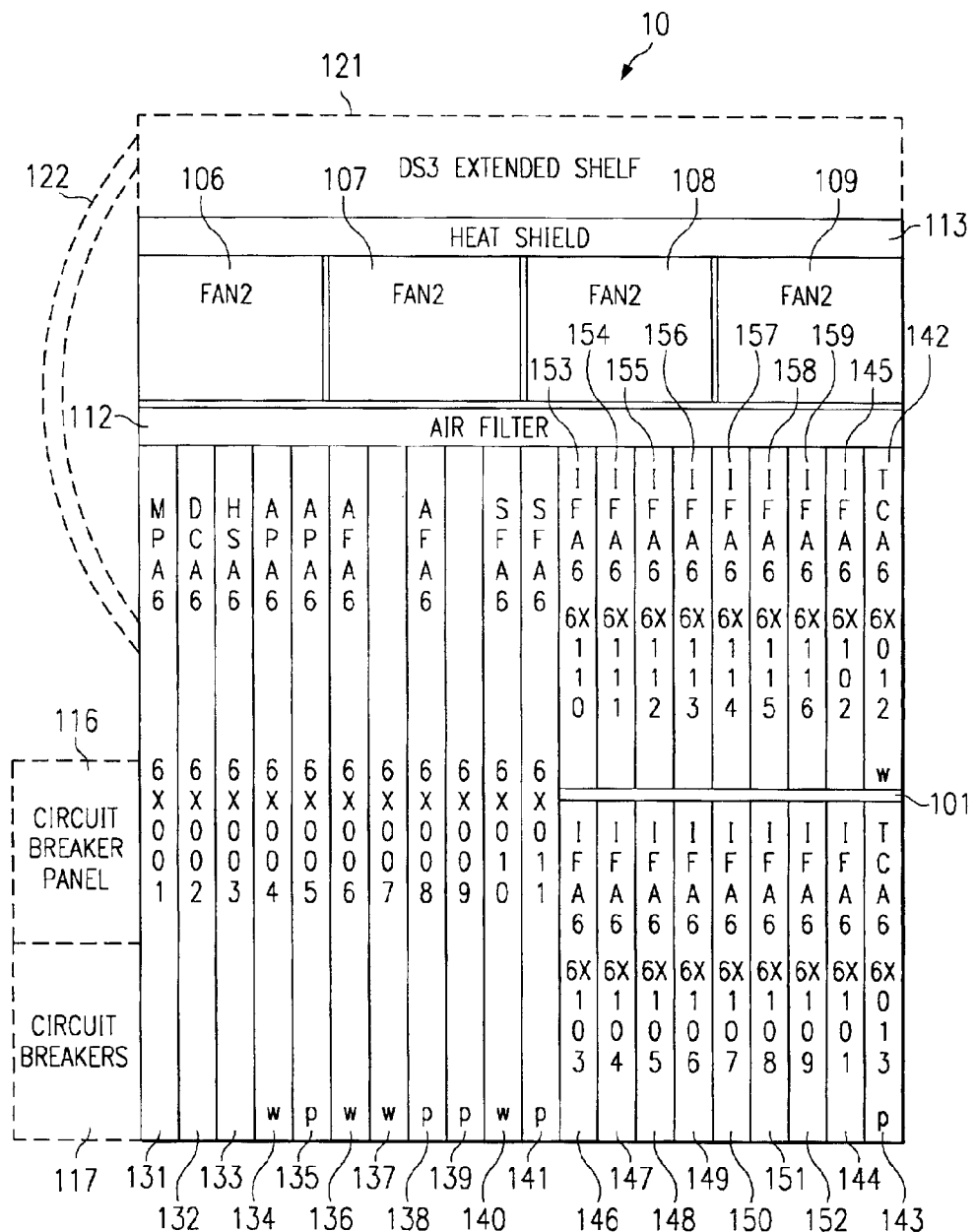
FIG. 6 is a diagrammatic elevational front view of the apparatus of FIG. 1.
Figure 8B:
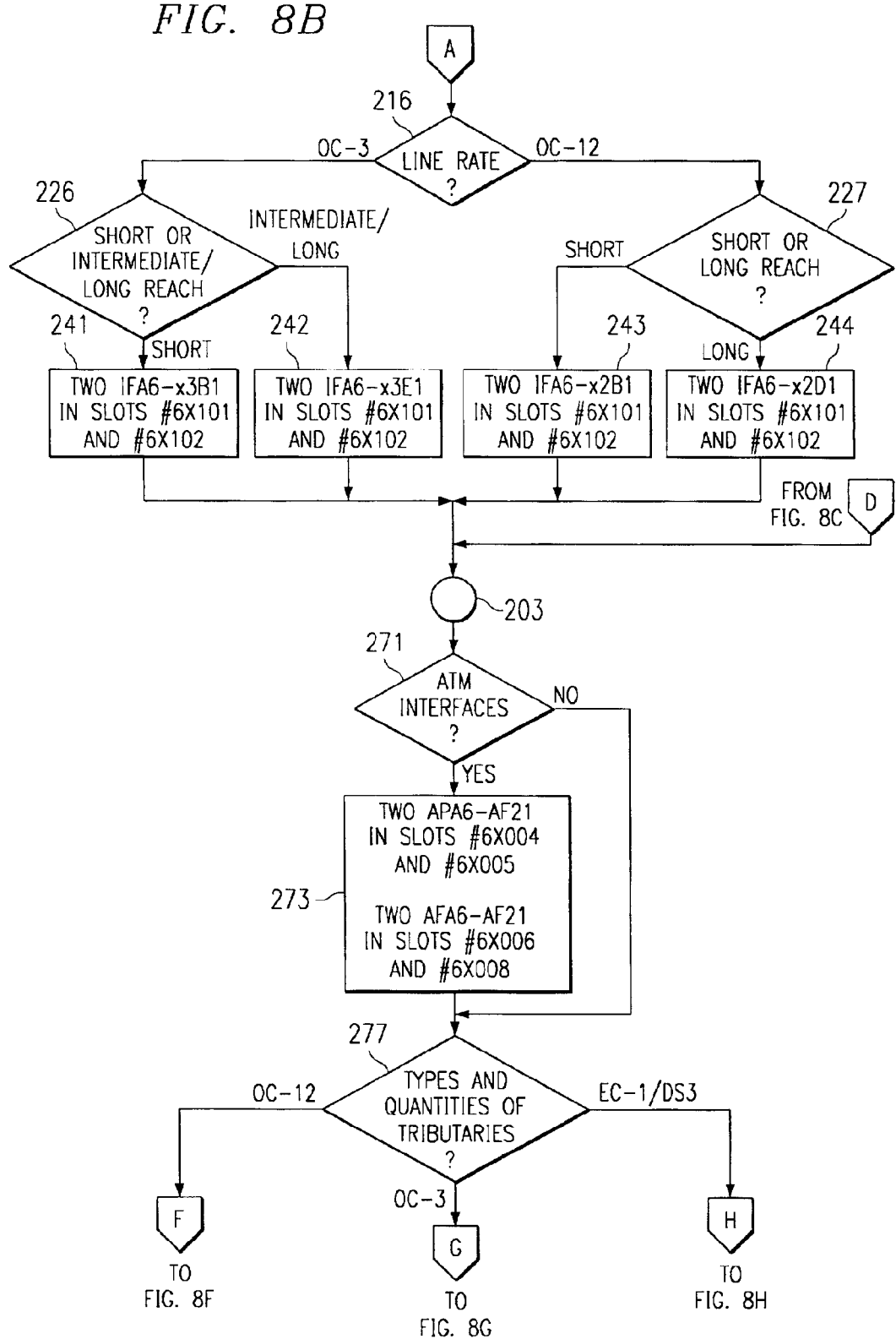
Figure 8E:
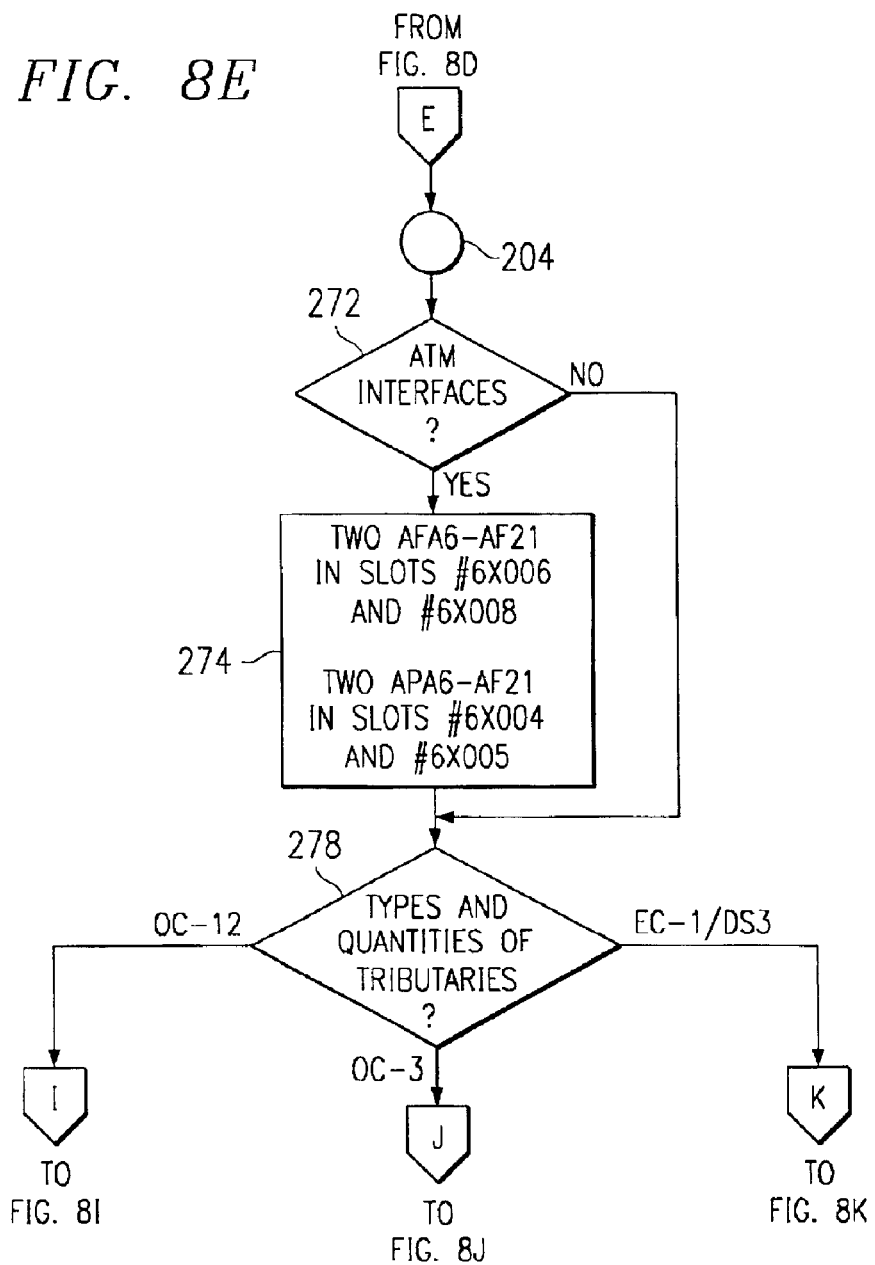
Figure 8F:
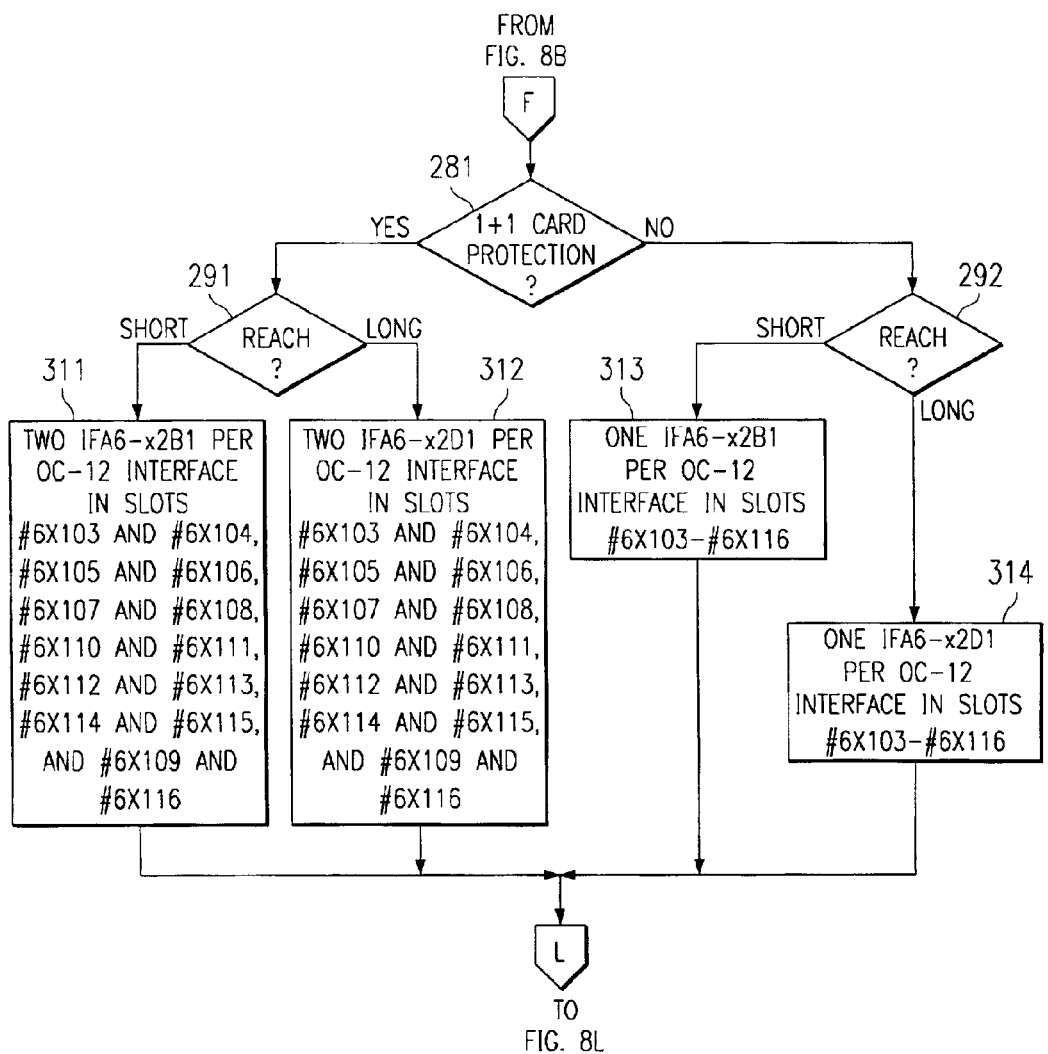
Figure 8G:
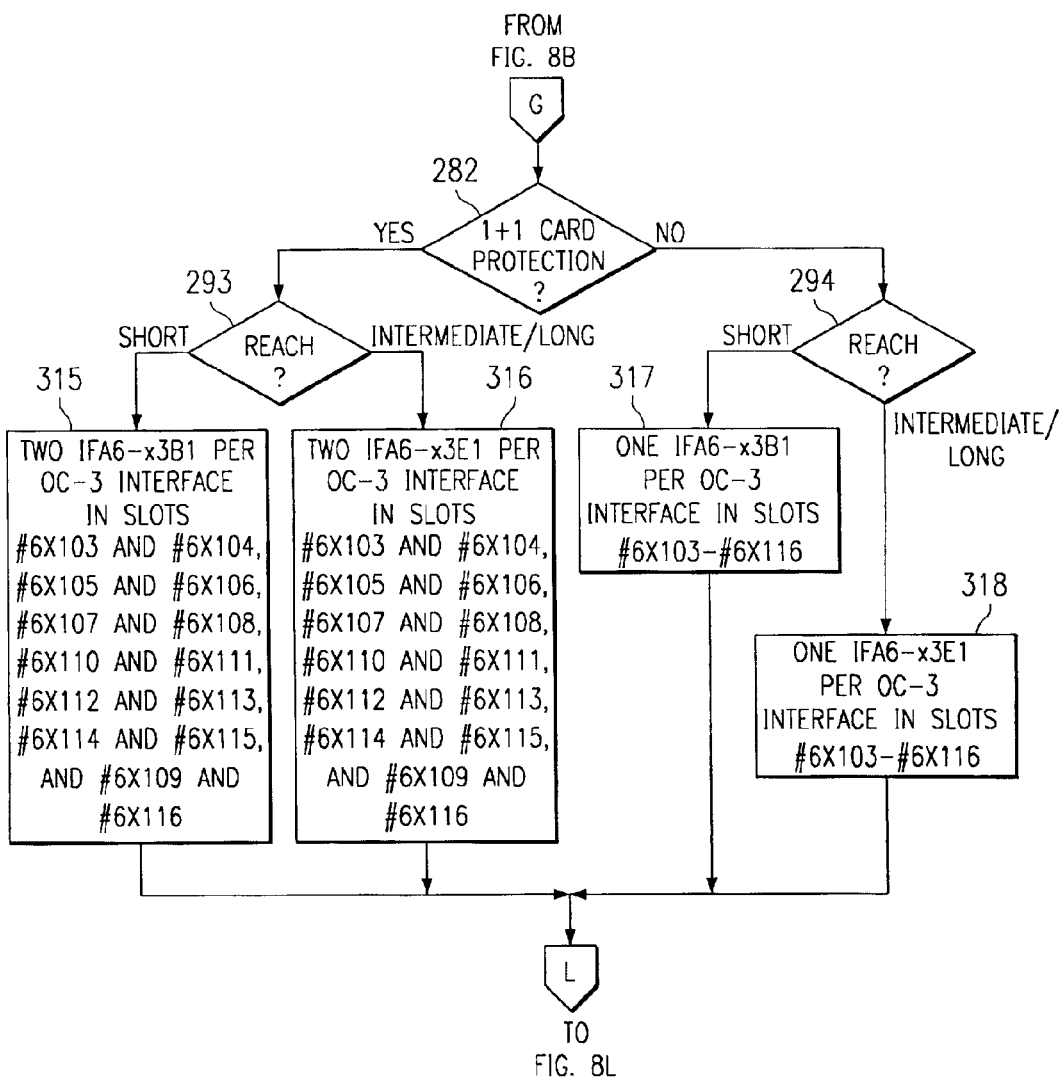
Figure 8H:
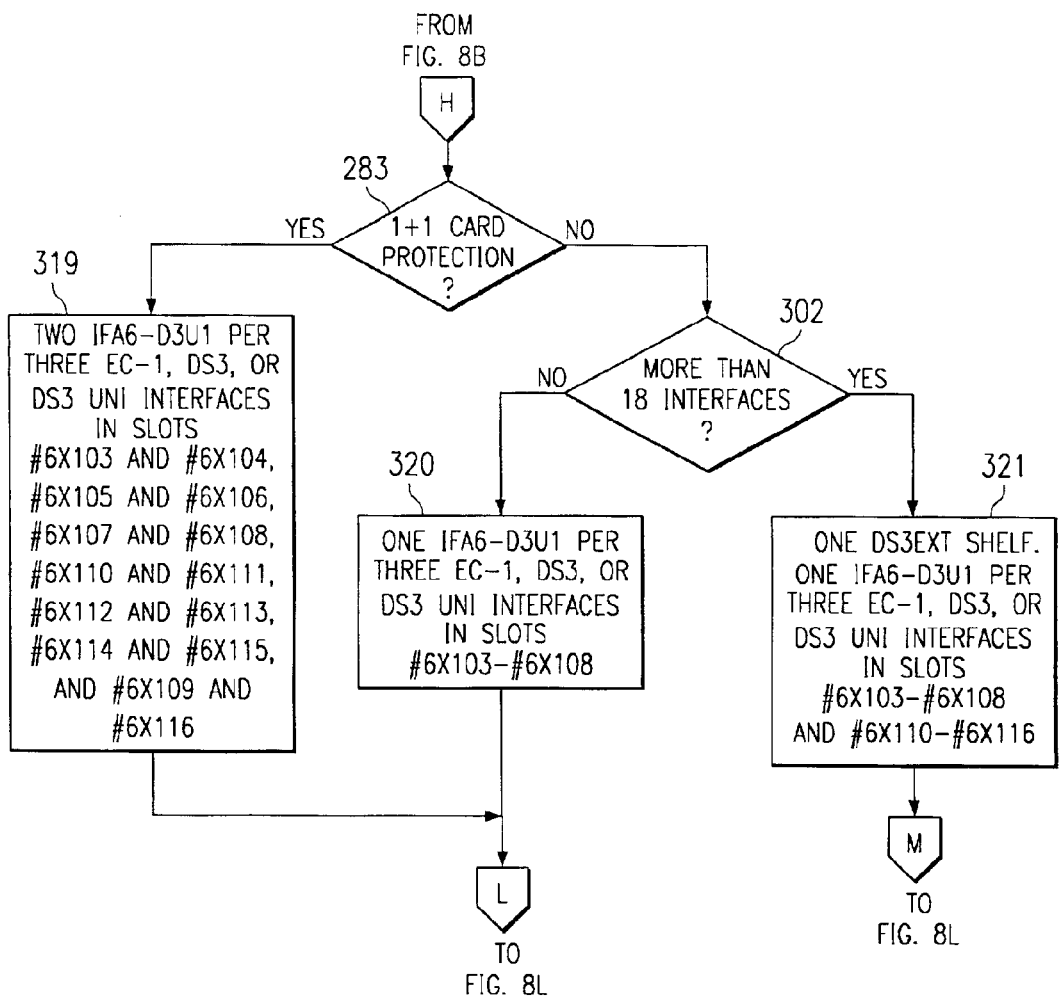
Figure 8I:
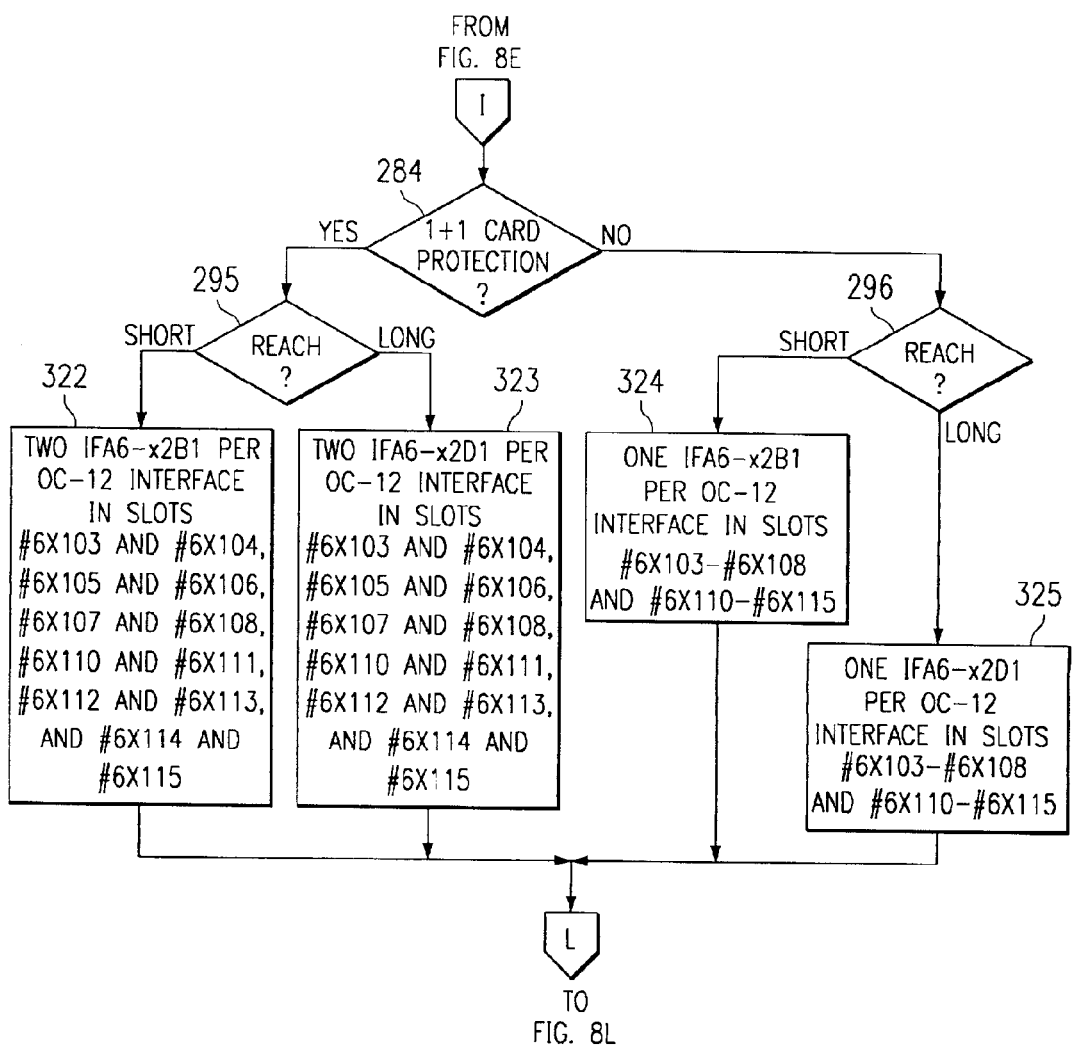
Figure 8J:
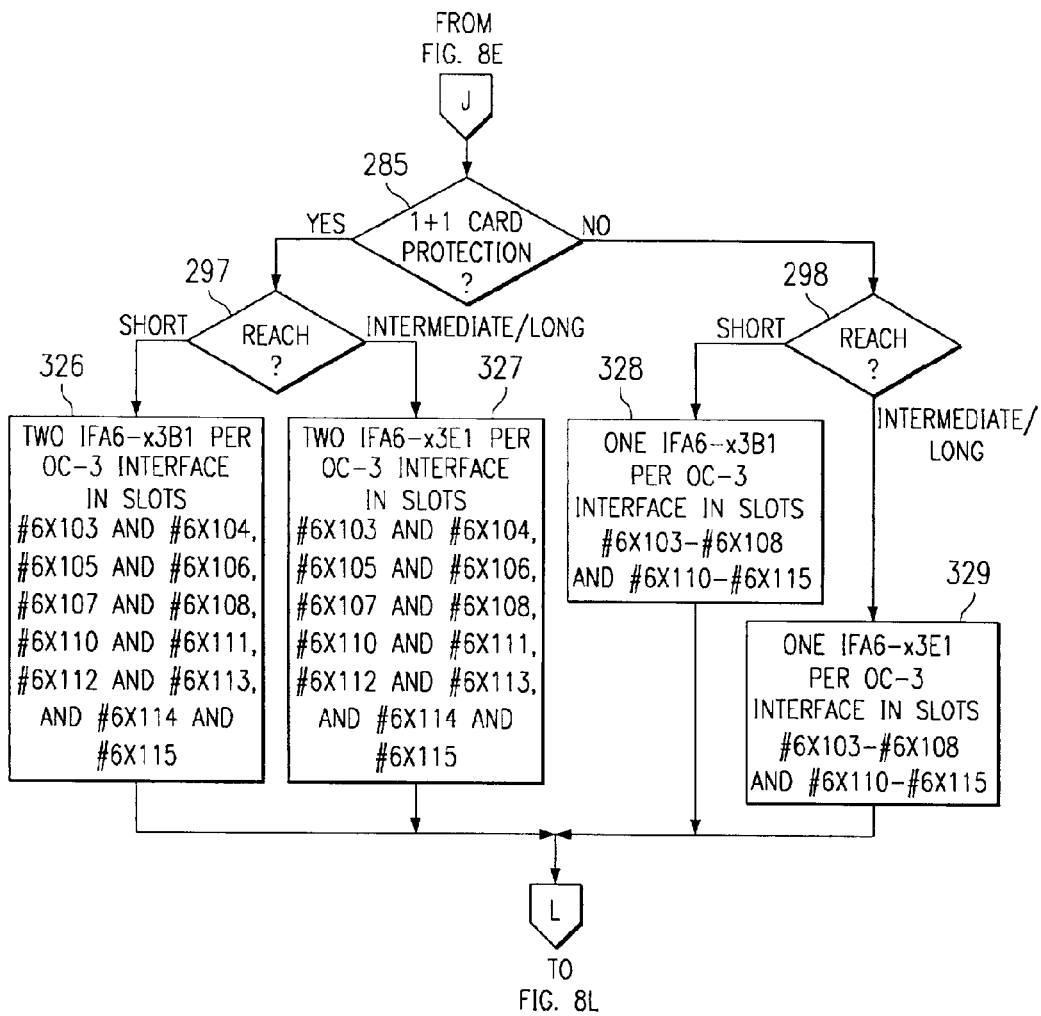
Figure 8K:
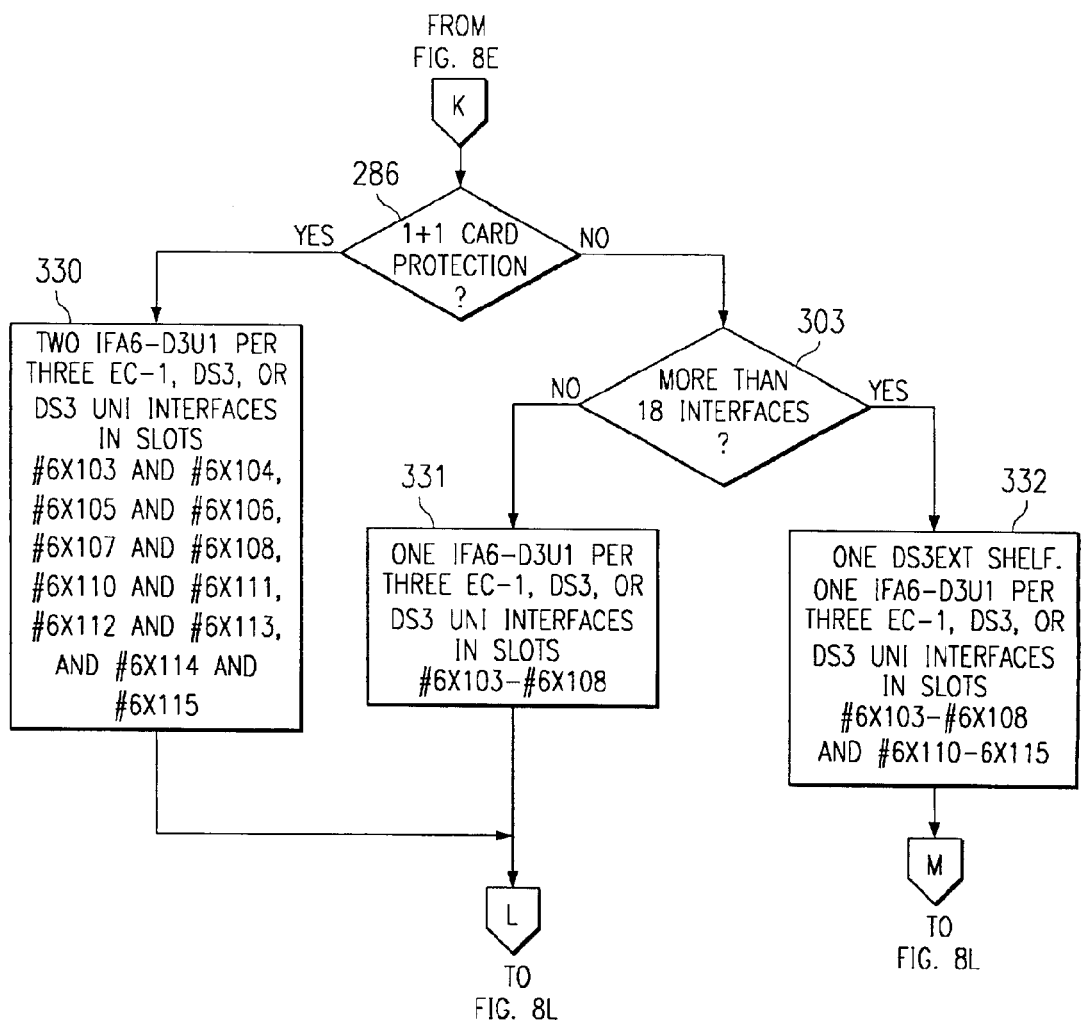
Figure 8L:
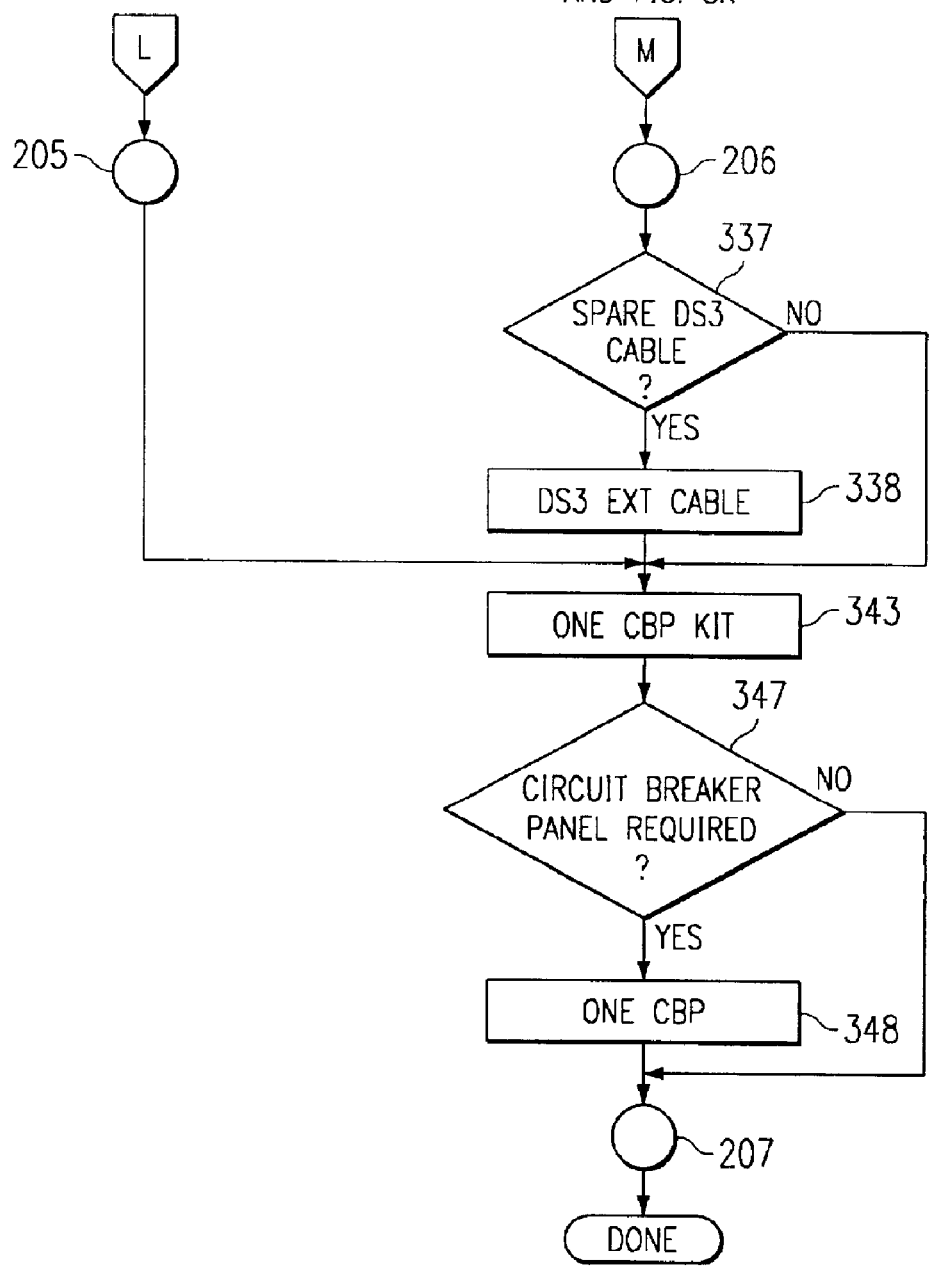

As shown in FIG. 6, the multiplexer apparatus 10 includes a shelf assembly 101, which is shown in solid lines in FIG. 6, and which serves as a mounting platform for other components. In this regard, four cooling fan units 106–109, which have a component name of FAN2, are removably installed in respective slots within the shelf assembly 101. The fans 106–109 facilitate a flow of cooling air through the shelf assembly 101. An air filter 112 is removably installed in a further opening or slot within the shelf assembly 101, and serves to filter the air that is forced to flow through the shelf assembly 101 by the fans 106–109. A heat shield 113 is also installed in the shelf assembly 101, to provide a degree of heat shielding. The heat shield 113 also helps to guide the flow of cooling air generated by the four fans 106–109.

A circuit breaker panel (CBP) 116 may be associated with the shelf assembly 101. The CBP 116 is not physically coupled to the shelf assembly 101, but is typically installed nearby and then electrically coupled by wiring to the shelf assembly 101. Since the CBP 116 is not actually a physical part of the apparatus 10, it is shown in broken lines in FIG. 6. It is possible that the shelf assembly 101 will be installed in a location near a pre-existing circuit breaker panel that was installed for use with other equipment, and that has sufficient unused capacity to accept additional circuit breakers for the shelf assembly 101. In that situation, the existing circuit breaker panel would be used, and the CBP 116 would not be needed. The shelf assembly 101 is operated using 30-ampere circuit breakers, shown here at 117 and referred to as a circuit breaker kit (CS Kit). If the CBP 116 is used, then circuit breakers from the CB Kit 117 are installed in the CBP 116. Alternatively, if some other existing circuit breaker panel is already in place, such that the CBP 116 is not needed, then the circuit breakers for CB Kit 117 can be installed in the existing circuit breaker panel instead.

A component known as a DS3 extended shelf can optionally be mounted on top of the shelf assembly 101. Since it is optional, it is shown in broken lines. If present, it is electrically coupled to the shelf assembly 101 by a cable, which is shown in broken lines at 122. The extended shelf 121 contains circuitry that provides eighteen additional tributary interfaces of the DS3 type.

The shelf assembly 101 has twenty-nine openings or slots 131–159, which have respective slot names 6X001–6X013 and 6X101–6X116. The slots 131–141 are full-height slots, and the slots 142–159 are half-height slots. Each of the slots 131–159 can removably receive a circuit card, in a manner described in more detail later. Some slots must always contain a particular type of circuit card, in every possible configuration of the apparatus 10. Other slots can removably receive circuit cards of different types, depending on the configuration, and in some configurations may contain no card at all. Depending on which circuit cards are present, and in which slots, the multiplexer apparatus 10 can be configured in a variety of different ways, each of which is treated herein as a respective different product.

In FIG. 6, the five full-height slots 131–135 at the far left end of shelf assembly 101, and the two-half height slots 142–143 at the far right end of the shelf assembly 101, collectively correspond to the management section 48 of FIGS. 1 and 5. The remaining six full-height slots 136–141 correspond to the switch section 43 of FIGS. 1 and 5. The two half-height slots 152 and 159 may correspond to either the transport section 41 or the tributary section 52, depending on the particular configuration of circuit cards which is installed. With this mind, the twelve half-height slots 146–151 and 153–158, and in some cases the half-height slots 152 and 159, correspond to the tributary section 46 of FIGS. 1 and 5. The two half-height slots 144 and 145, and in some cases the half-height slots 152 and 159, correspond to the transport section 41 of FIGS. 1 and 5. The various types of circuit cards which can be removably inserted into the slots 131–159 have already been briefly discussed above, and will be discussed in more detail later.

As mentioned earlier, the multiplexer apparatus 10 can be configured in a wide variety of different ways, in part by inserting a selected one of a wide variety of different combinations of circuit cards into the slots 131–159. Consequently, from the point of view of a prospective purchaser, it could be a rather complex and confusing task to decide which circuit cards and other components should be separately purchased for later assembly into a physical product that will accurately and reliably perform a desired function. An attempt to manually configure a valid product at this level requires substantial technical knowledge regarding the multiplexer apparatus 10, including various considerations such as mechanical and electrical limitations and incompatibilities. The present invention was developed to provide an efficient technique for developing, for a set of components, a methodology that facilitates simple and accurate configuration of any valid product from the myriad of possible combinations of available components. This technique according to the invention will now be explained in the context of the multiplexer apparatus 10 that has been described above in association with FIGS. 1–6.

FIG. 7 is a high-level flowchart showing a sequence of steps representing one approach to implementation of the technique of the present invention. Each of the steps of FIG. 7 will first be briefly described at a general level. Then, each step will be described in more detail, in the specific context of the exemplary multiplexer apparatus 10 of FIGS. 1–6.

In FIG. 7, an inventory list is prepared at 191. This list identifies every single component which is available for separate purchase by a customer and could be a part of any valid configuration of the apparatus which is of interest. In a given product, a given component might be used once, twice or more, or not at all. Next, at 192, a component information package is prepared. This package includes detailed information regarding each of the components in the inventory list, as discussed later.

Then, at 193, each of the components in the inventory list is categorized with respect to whether it corresponds to each of several different classes. A given component can correspond to more than one class. TABLE 1 sets forth three classes that are used in the disclosed embodiment of the invention, and that are referred to herein as Classes 1–3. The references in TABLE 1 to products are references to the set of valid products that can be assembled from the components set forth in the inventory list prepared in block 191 of FIG. 7. In addition to the three primary classes of components set forth in TABLE 1, the disclosed embodiment of the invention recognizes a fourth class directed to ancillary components, which are components that are related to valid products, but are not a direct physical part of those products.

Next, at block 196 of FIG. 7, one or more criteria sets are developed. In the disclosed embodiment, and as discussed later, a first criteria set is developed which provides a mapping between each valid product and a corresponding valid combination of components from Class 2. A second criteria set is developed to provide a similar mapping between each product and a corresponding valid combination of components from Class 3. The criteria in the second set may overlap with some of the criteria in the first set. A third criteria set is developed to provide a mapping between each product and a corresponding valid combination of components from the ancillary component class, and the criteria in the third set may overlap with criteria from either or both of the first and second criteria sets. In general, the criteria will relate to information that must be obtained from a prospective purchaser in order to know how to configure a product to meet the particular needs of that purchaser, such as product characteristics that must be specified by the purchaser. For example, in the case of the apparatus 10 of FIG. 1, a purchaser would need to specify the speed for the transport ports 16 and 17 (as either OC-12 or OC-3).

TABLE 1

COMPONENT CLASSES

| Class | Description |
| --- | --- |
| 1 | Components that are required in each product without variation in quantity or type. |
| 2 | Components that are required in each product but that vary among the products with respect to quantity and/or type. |
| 3 | Components that are present in some but not all products, and that may vary with respect to quantity and/or type. |

Then, at block 197 in FIG. 7, a flowchart is prepared. The flowchart graphically represents both the criteria in the criteria sets, and also the valid combinations of components for each class. An example of such a flowchart is illustrated and described later.

Each of the steps set forth in the flowchart of FIG. 7 will become clearer when explained in the context of a specific example, such as the apparatus 10 discussed above in association with FIGS. 1–6. As discussed above, the first step in the flowchart of FIG. 7 is block 191, which involves preparation of an inventory list setting forth every component which might possibly be used in assembling any of the many products that are valid versions of the multiplexer apparatus 10 of FIG. 1. TABLE 2 is a component inventory list identifying each of seventeen components that are available for use in assembling the multiplexer apparatus 10 of FIG. 1. The left column of TABLE 2 contains arbitrary and sequential item numbers which each identify a respective one of the seventeen components listed in TABLE 2, in order to help clearly identify particular components in the following discussion of TABLE 2. The next column gives a part name for each component type, and in this regard it will be noted that item 17 in TABLE 2 is a single component (IFA6-xxx1) which has twelve different types with respective different part numbers. This is because these twelve types of circuit card are all extremely similar, in that they each implement optical channel interfaces of either the OC-12 or OC-3 type. Some differ from each other only as to what type of industry-standard connector they use (SC, FC or ST). The remaining column(s) provide a brief description for each type of component listed in TABLE 2.

A comment is appropriate at this point regarding the information set forth in TABLE 2. Item 7 in TABLE 2 includes both the extended shelf 121 (FIG. 6) and the associated cable 122. Item 8 in TABLE 2 is a spare cable which is identical to the cable shown at 122 in FIG. 6. Items 7 and 8 in TABLE 2 each refer to the cable because a purchaser has the option of purchasing item 7, or both item 7 and item 8. If a purchaser buys item 7, the purchaser gets both the extended shelf 121 and the cable 122. In contrast, if the purchaser buys item 7 and also item 8, the purchaser gets the extended shelf 121 and two of the cables 122, one of which serves as a spare cable.

TABLE 2

COMPONENT INVENTORY LIST

| | Name | Description | | |
|---|---|---|---|---|
| 1 | Shelf | Shelf assembly | | |
| 2 | FAN2 | Fan unit | | |
| 3 | Air Filter | Replaceable air filter | | |
| 4 | Heat Shield | Heat shield | | |
| 5 | CBP | Circuit breaker panel | | |
| 6 | CB Kit | 30 ampere circuit breakers | | |
| 7 | DS3 ExtShelf | DS3 extension shelf, with cable | | |
| 8 | DS3 CAB1 | Spare cable for DS3 extension shelf | | |
| 9 | MPA6-CPU1 | Microprocessor unit | | |
| 10 | DCA6-MEM1 | Data communication channel (DCC) unit | | |
| 11 | HSA6-AHB1 | High speed switch unit | | |
| 12 | TCA6-ST31 | Timing control unit | | |
| 13 | SFA6-SF11 | STS switch fabric | | |
| 14 | APA6-AP21 | ATM processor unit | | |
| 15 | AFA6-AF21 | ATM switch fabric | | |
| 16 | IFA6-D3U1 | DS3/EC-1 interface unit | | |
| 17 | IFA6-C3B1 | SC connector | short reach | OC-3 |
| | IFA6-F3B1 | FC connector | | interface |
| | IFA6-T3B1 | ST connector | | |
| | IFA6-C3E1 | SC connector | long/ | |
| | IFA6-F3E1 | FC connector | intermediate | |
| | IFA6-T3E1 | ST connector | reach | |
| | IFA6-C2B1 | SC connector | short reach | OC-12 |
| | IFA6-F2B1 | FC connector | | interface |
| | IFA6-T2B1 | ST connector | | |
| | IFA6-C2D1 | SC connector | long reach | |
| | IFA6-F2D1 | FC connector | | |
| | IFA6-T2D1 | ST connector | | |

The next step in FIG. 7 is block 192, and involves preparation of a component information package. As discussed above, this component information package includes detailed information for each component which is the inventory list. Among other things, the information for each component includes an identification of each of the types of that component, and also includes configuration rules for that component. Configuration rules identify the conditions under which a particular type and quantity of cards are used, and the designated slot numbers for each of these cards. The component information package for the multiplexer apparatus 10 of FIG. 1 is set forth in TABLE 3. It will be noted that TABLE 3 includes seventeen entries, each of which corresponds to a respective one of the seventeen components identified in the inventory list of TABLE 2. TABLE 3 is believed to be self-explanatory, and thus a detailed discussion of TABLE 3 here would be redundant to TABLE 3 itself.

TABLE 3

COMPONENT INFORMATION PACKAGE

MPA6-CPU1 (Microprocessor Unit)
Network element shelf controller unit, class A.
Functions as the main processing platform for the system, providing the software platform to handle various command syntax to and from the network element.

TABLE 3-continued

COMPONENT INFORMATION PACKAGE

It also supports all the configuration, fault, state, and alarm management software.
Features:
    Network element central processing plug-in unit
    Craft port and external modem interface port
    Alarm management and processing (monitoring and provisioning)
    Non-volatile random access memory storage for software and database parameters
    Software download
    Remote memory backup and restore
    7-layer open systems interconnect and transaction language 1
Usage:
One MPA6-CPU1 is required per shelf.
Slot Assignments:
Slot #6X001
Configuration Rules:
One MPA6-CPU is required in slot #6X001.
DCA6-MEM1 (DCC Unit)
DCC processor unit, class A. Handles Section DCC (SDCC) communications, and outputs office alarms from the shelf to external devices.
Features:
    Support for 16 SDCCs
    Alarm light emitting diodes (LEDs) on plug-in unit's front panel
    Visual and audible alarm relay outputs
    16 housekeeping inputs
    Non-volatile random access memory (secondary and standby) of provisioning data and program files
    Local area network (LAN) interface
Usage:
One DCA6-MEM1 is required per shelf.
Slot Assignments:
Slot #6X002
Configuration Rules:
One DCA6-MEM1 is required in slot #6X002.
HSA6-AHB1 (High-Speed Switch Unit)
High-speed protection switching unit, class A.
Controls the equipment and facility (line) protection switching. One HSA6-AHB1 plug-in unit is used in each shelf and serves as the central controller for communications between plug-in units.
Features:
    Switching control of the equipment interface plug-in units
    1 + 1 non-revertive automatic protection switching (APS) of the OC-3 and OC-12 line and may be provisioned for unidirectional or bidirectional switching
    Processing of SONET overhead bytes
    Detection of installed plug-in units
    Provisioning information distribution to plug-in units
    Alarm, inventory, and performance monitoring data collection from other plug-in units
Usage:
One HSA6-AHB1 is required per shelf.
Slot Assignments:
Slot #6X003
Configuration Rules:
One HSA6-AHB1 is required in slot #6X003.
APA6-AP21 (ATM Processor Unit)
This is the central processor responsible for ATM data switching, and works in conjunction with the ATM-SF Interface Unit in provisioning permanent virtual circuits (PVC), and performing operations, administration, and maintenance (OAM) functions on all incoming and outgoing cells.
Features:
    32 Mbytes DRAM main memory
    2 Mbytes FLASH memory
    Software downloadable
    CAC for virtual path and virtual circuit links
    ATM cell header processing and cell switching scheduler TABLE 3-continued

COMPONENT INFORMATION PACKAGE

ATM database management
1:1 equipment protection
2.5 G of switch fabric control
Usage:
Two APA6-AP21 are used when ATM switch fabric control
and signaling is required.
Slot Assignments:
Slots #6X004 and #6X005
Configuration Rules:
If ATM switch fabric control and signaling is required,
then two APA6-AP21 are required in slots #6X004 and
6X005.
TCA6-ST31 (Timing Control Unit)
Stratum 3 synchronization unit. Provides a frequency
reference to the system from a variety of timing
sources. The timing sources can be external or
internal.
Features:
    Stratum 3 oscillator
    Synchronization status messaging support
    Provisionable timing source priority list
    Selection of highest quality timing source
    available from various external sources or from
    internal oscillator
    1:1 equipment protection
Usage:
Two TCA6-ST31 are required per shelf.
Slot Assignments:
Slots #6X012 and #6X013
Configuration Rules:
Two TCA6-ST31 are required in slots #6X012 and #6X013.
AFA6-AF21 (ATM-SF Interface Unit)
2.5 Gbps ATM switch fabric. Receives ATM cells on an
input port and switches them to an output port. Works
in conjunction with the ATM Processor Unit to switch
and route ATM cells. Each ATM-SF unit supports a 48 STS
bandwidth, broken down into 4 STS-12 signals.
Features:
    Virtual path and virtual channel cell switching
    Nonblocking fabric to minimize cell loss rate
    Support for 16000 virtual path and virtual channel
    links
    Support for 8000 virtual path and virtual channel
    cross-connects
    Usage parameter control and congestion marking
    (explicit forward congestion indicator)
    Support for virtual path tunneling (virtual ATM
    interface) and virtual path protection
    SONET path termination, origination, and alarming
    F4/F5 OAM (operations, administration and
    maintenance) functions (AIS, RDI, and loopback)
    Throughput of 2.5 G
    1:1 equipment protection
    Support of five different traffic classes
        Constant bit rate (CBR)
        Real-time variable bit rate (rt-VBR)
        Non-real time variable bit rate (nrt-VBR)
        Available bit rate (ABR)
        Unspecified bit rate (UBR)
Usage:
Two AFA6-AF21 are used when ATM interface capability is
required.
Slot Assignments:
Slots #6X006 and #6X008
Configuration Rules:
If ATM interfaces capability is required, then two
AFA6-AF21 are required in slots #6X006 and #6X008.
SFA6-SF11 (STS-SF Interface Unit)
6 G STS switch fabric 120 × 120 throughput, 48 STS-1 each
feed the virtual tributary (VT) and ATM sub-fabric,
class A. Provides STS-1 cross-connect functionality
(time slot interchange), and STS-1 path monitoring.
Features:
    STS-1, STS-3c, and STS-12c cross-connects
    Full Time Slot Interchange (TSI) capability
    STS provisionable redline, path switch default,
    and revertive operation TABLE 3-continued

COMPONENT INFORMATION PACKAGE

120 × 120 STS-1 switch fabric
    48 STS-1 feeds to virtual tributary (VT) and ATM
    sub-fabric
Usage:
Two SFA6-SF11 are required per shelf.
Slot Assignments:
Slots #6X010 and #6X011
Configuration Rules:
Two SFA6-SF11 are required in slots #6X010 and #6X011.
IFA6-xxx1 (OC-3 or OC-12 Interface Unit)
    IFA6-x3B1 -    OC-3 interface; short reach; multi-mode and
        single-mode fiber; SC (C3B1), FC (F3B1), or
        ST (T3B1) type fiber-optic connectors.
    IFA6-x3E1 -    OC-3 interface; intermediate/long reach;
        SC (C3E1), FC (F3E1), or ST (T3E1) type
        fiber optic connectors.
    IFA6-x2B1 -    OC-12 interface, short reach; multi-mode
        and single-mode fiber; SC (C2B1),
        FC (F2B1), or ST (T2B1) fiber optic
        connectors.
    IFA6-x2D1 -    OC-12 interface, long reach; temperature
        hardened; SC (C2D1), FC (F2D1), or ST
        (T2D1) type fiber optic connectors.
Each IFA6-x3x1 unit provides a universal OC-3 interface
for line or tributary, and multiplexes/de-multiplexes
three STS-1. Each IFA6-x2x1 unit provides a universal
OC-12 interface for line or tributary, and
multiplexes/de-multiplexes twelve STS-1.
Features:
    All IFA6-x3x1:
        OC-3 optical interface
        STS-1 and STS-3c payload support
        Provisionable SONET and synchronous digital
        hierarchy (SDH) STM-1 payload support
        Synchronization status messaging support
        ATM cell mapping
        Universal interface for line or tributary
        applications in any IFA6 slot
        Terminal, linear ADM, and UPSR application
        support
        1310 nm, single-mode or multi-mode fiber
        support
        Available with FC (F3 × 1), ST (T3 × 1), or
        SC (C3 × 1) type fiber optic
        connectors/adaptors
    Additional for IFA6-x3B1:
        OC-3 short reach interface
        Support of multi- and single-mode fiber
        Standard temperature operation
    Additional for IFA6-x3E1:
        Software provisionable for OC-3 intermediate
        and long-reach applications
        Support of single-mode fiber
        Extended temperature operation
    All IFA6-x2x1 units:
        OC-12 optical interface
        STS-1, STS-3c, and STS-12c payload support
        Provisionable SONET and synchronous digital
        hierarchy (SDH) STM-4 support
        Synchronized status messaging support
        ATM mapping support
        Universal interface for line or tributary in
        all IFA6 slots
        Support of Terminal, linear ADM, and UPSR
        applications
        1310 nm, single-mode or multi-mode fiber
        support
        Available with FC (F2 × 1), ST (T2 × 1), and SC
        (C2 × 1) fiber optic connectors/adaptors
    Additional for IFA6-x2B1:
        OC-12 short reach interface
        Support of multi- and single-mode fiber
        Standard temperature operation
    Additional for IFA6-x2D1:
        OC-12 long reach interface
        Support of single-mode fiber
        Extended temperature operation

TABLE 3-continued

COMPONENT INFORMATION PACKAGE

Usage:
For line interfaces, one IFA6-x3x1 is used per OC-3 line (working or protect). For tributaries, two IFA6-x3x1 are used per protected OC-3 interface to a maximum of seven protected OC-3 tributaries. One IFA6-x3x1 is used per unprotected OC-3 tributary to a maximum of 14 unprotected OC-3 tributaries.
For line interfaces, one IFA6-x2x1 is used per OC-12 line (working or protect). For tributaries, two IFA6-x2x1 are used per protected OC-12 interface to a maximum of seven protected OC-12 tributaries. One IFA6-x2x1 is used per unprotected OC-12 tributary to a maximum of 14 unprotected OC-12 tributaries.
Slot Assignments:
OC-3: Slots #6X101, #6X102, #6X109, and #6X116 for transport; slots #6X103–#6X116 for tributaries.
OC-12: Slots #6X101, #6X102, #6X109, and #6X116 for transport; slots #6X103–#6X115 for tributary.
Configuration Rules:
For OC-3 line interfaces,
    If network element Type is Terminal,
        If short reach OC-3 lines are required,
            If protected OC-3 line interface is required, then two IFA6-x3B1 are required in slots #6X101 & #6X102.
            If unprotected OC-3 line interface is required, then one IFA6-x3B1 is required for each OC-3 line in slots #6X101.
        If intermediate or long reach OC-3 lines are required,
            If protected OC-3 line interface is required, then two IFA6-x3E1 are required for each OC-3 line in slots #6X101 and #6X102.
            If unprotected OC-3 line interface is required, then one IFA6-x3E1 is required in slots #6X101.
    If network element Type is UPSR,
        If short reach OC-3 lines are required, then two IFA6-x3B1 are required in slots #6X101 & #6X102.
        If intermediate or long reach OC-3 lines are required, then two IFA6-x3E1 are required in slots #6X101 and #6X102.
    If network element Type is Linear ADM,
        If short reach OC-3 line interface is required,
            If protected OC-3 line interfaces are required, then four IFA6-x3B1 are required in slots #6X101 & #6X102, and #6X109 & #6X116.
            If unprotected OC-3 line interfaces are required, then two IFA6-x3B1 are required in slots #6X101 and #6X109.
        If intermediate or long reach OC-3 line interface is required,
            If protected OC-3 line interfaces are required, then four IFA6-x3E1 are required in slots #6X101 & #6X102, and #6X109 & #6X116.
            If unprotected OC-3 line interfaces are required, then two IFA6-x3E1 are required in slots #6X101 and #6X109.
For OC-3 tributaries,
    If network element Type is Terminal or UPSR,
        If short reach is required,
            If protected OC-3 tributaries are required, then two IFA6-x3B1 are required for each protected OC-3 tributary in slots #6X103 & #6X104, #6X105 & #6X106, #6X107 & #6X108, #6X110 & #6X111, #6X112 & #6X113, #6X114 & #6X115, and #6X109 & #6X116, as needed.
            If unprotected OC-3 tributaries are required, then one IFA6-x3B1 is required for each unprotected OC-3 tributary in slots #6X103–#6X116, as needed.
        If intermediate or long-reach is required,
            If protected OC-3 tributaries are required, then two IFA6-x3E1 are required for each protected OC-3 tributary in slots #6X103 & #6X104, #6X105 & #6X106, #6X107 & #6X108, #6X110 & #6X111, #6X112 & #6X113, #6X114 & #6X115, and #6X109 & #6X116, as needed.
            If unprotected OC-3 tributaries are required, then one IFA6-x3E1 is required for each unprotected OC-3 tributary in slots #6X103–#6X116, as needed.
    If network element Type is Linear ADM,
        If short reach is required,
            If protected OC-3 tributaries are required, then two IFA6-x3B1 are required for each protected OC-3 tributary in slots #6X103 & #6X104, #6X105 & #6X106, #6X107 & #6X108, #6X110 & #6X111, #6X112 & #6X113, and #6X114 & #6X115, as needed.
            If unprotected OC-3 tributaries are required, then one IFA6-x3B1 is required for each unprotected OC-3 tributary in slots #6X103–#6X108 and #6X110–#6X115, as needed.
        If intermediate or long-reach is required,
            If protected OC-3 tributaries are required, then two IFA6-x3E1 are required for each protected OC-3 tributary in slots #6X103 & #6X104, #6X105 & #6X106, #6X107 & #6X108, #6X110 & #6X111, #6X112 & #6X113, and #6X114 & #6X115, as needed.
            If unprotected OC-3 tributaries are required, then one IFA6-x3E1 is required for each unprotected OC-3 tributary in slots #6X103–#6X108 and #6X110–#6X115, as needed.
For OC-12 line interfaces,
    If network element Type is Terminal,
        If short reach OC-12 lines are required,
            If protected OC-12 line interface is required, then two IFA6-x2B1 are required in slots #6X101 & #6X102.
            If unprotected OC-12 line interface is required, then one IFA6-x2B1 is required for each OC-12 line in slots #6X101.
        If intermediate or long reach OC-12 lines are required,
            If protected OC-12 line interface is required, then two IFA6-x2E1 are required for each OC-12 line in slots #6X101 & #6X102.
            If unprotected OC-12 line interface is required, then one IFA6-x2E1 is required in slots #6X101.
    If network element Type is UPSR,
        If short reach OC-12 lines are required, then two IFA6-x2B1 are required in slots #6X101 & #6X102.
        If intermediate or long reach OC-12 lines are required, then two IFA6-x2E1 are required in slots #6X101 & #6X102.
    If network element Type is Linear ADM,
        If short reach OC-12 line interface is required,
            If protected OC-12 line interface is required, then two IFA6-x2B1 are required in slots #6X101 & #6X102, and #6X109 & #6X116.
            If unprotected OC-12 line interface is required, then one IFA6-x2B1 is required in slots #6X101 and #6X109.
        If intermediate or long reach OC-12 line interface is required,
            If protected OC-12 line interface is

TABLE 3-continued

COMPONENT INFORMATION PACKAGE required, then two IFA6-x2E1 are
 required in slots #6X101 & #6X102, and
 #6X109 & #6X116.
 If unprotected OC-12 line interface is
 required, then one IFA6-x2E1 is required
 in slots #6X101 and #6X109.
For OC-12 tributaries,
 If network element Type is Terminal or UPSR,
  If short reach is required,
   If protected OC-12 tributaries are
   required, then two IFA6-x2B1 are
   required for each protected OC-12
   tributary in slots #6X103 & #6X104,
   #6X105 & #6X106, #6X107 & #6X108, #6X110
   & #6X111, #6X112 & #6X113, #6X114 &
   #6X115, and #6X109 & #6X116, as needed.
   If unprotected OC-12 tributaries are
   required, then one IFA6-x2B1 is required
   for each unprotected OC-12 tributary in
   slots #6X103–#6X116, as needed.
  If intermediate or long-reach is required,
   If protected OC-12 tributaries are
   required, then two IFA6-x2E1 are
   required for each protected OC-12
   tributary in slots #6X103 & #6X104,
   #6X105 & #6X106, #6X107 & #6X108, #6X110
   & #6X111, #6X112 & #6X113, #6X114 &
   #6X115, and #6X109 & #6X116, as needed.
   If unprotected OC-12 tributaries are
   required, then one IFA6-x2E1 is required
   for each unprotected OC-12 tributary in
   slots #6X103–#6X116, as needed.
 If network element Type is Linear ADM,
  If short reach is required,
   If protected OC-12 tributaries are
   required, then two IFA6-x2B1 are
   required for each protected OC-12
   tributary in slots #6X103 & #6X104,
   #6X105 & #6X106, #6X107 & #6X108, #6X110
   & #6X111, #6X112 & #6X113, and #6X114 &
   #6X115, as needed.
   If unprotected OC-12 tributaries are
   required, then one IFA6-x2B1 is required
   for each unprotected OC-12 tributary in
   slots #6X103–#6X108 and #6X110–#6X115,
   as needed.
  If intermediate or long-reach is required,
   If protected OC-12 tributaries are
   required, then two IFA6-x2E1 are
   required for each protected OC-12
   tributary in slots #6X103 & #6X104,
   #6X015 & #6X106, #6X017 & #6X108, #6X110
   & #6X111, #6X112 & #6X113, and #6X114 &
   #6X115, as needed.
   If unprotected OC-12 tributaries are
   required, then one IFA6-x2E1 is required
   for each unprotected OC-3 tributary in
   slots #6X103–#6X108 and #6X110–#6X115,
   as needed.
IFA6-D3U1 (DS-3/EC-1 Interface Unit)
This unit provides three DS3 or EC-1 line terminations.
Features:
 IFA6-D3U1:
  1:1 protection or 0:2 equipment protection
  Ports independently provisionable as DS3 or
  EC-1 ports
  Line Build Out (LBO) selection
 DS3 ports:
  Bit error rate monitoring
  M13, C-Bit, and clear channel applications
  DS3 user network interface (UNI) for ATM
  applications, physical layer convergence
  protocol (PLCP) and direct mode
  Terminal and Facility Loopback functions
 EC-1 ports:
  Synchronization status messaging
  Section Data Communications Channel (SDCC)
  ATM cell mapping support
Usage:
Two IFA6-D3U1 are used per 1:1 protected DS3/EC-1
interface to a maximum of twelve units (18 DS3/EC-1)
per shelf. One IFA6-D3U1 is used per 1:1 unprotected
DS3/EC-1 interface to a maximum of six units (18
DS3/EC-1) per shelf. Additional 36 DS3/EC-1 interfaces
are provided by converting the protection IFA6-D3U1
units to working by adding the DS3 extension shelf.
Slot Assignments:
Slots #6X103–#6X116
Configuration Rules:
If network element Type is Terminal or UPSR,
 If DS3/EC-1 tributaries are required,
  If the number of tributary signals is between
  one and 18 DS3/EC-1,
   If 1:1 protection is required, then two
   IFA6-D3U1 are required per three DS3 or
   EC-1 in slots #6X103 & #6X104, #6X105 &
   #6X106, #6X107 & #6X108, #6X110 &
   #6X111, #6X112 & #6X113, #6X114 &
   #6X115, and #6X109 & #6X116, as needed.
   If 1:1 protection is not required, then
   one IFA6-D3U1 is required per three DS3
   or EC-1 in any of slots #6X103 through
   #6X116, as needed.
  If more than 18 DS3/EC-1 are required, then
  one IFA6-D3U1 is required per three DS3 or
  EC-1 in slots #6X103, #6X104, #6X105, #6X106,
  #6X107, #6X108, #6X110, #6X111, #6X112,
  #6X113, #6X114, #6X115, and #6X116 as needed.
If network element Type is Linear ADM,
 If DS3/EC-1 tributaries are required,
  If the number of tributary signals is between
  one and 18 DS3/EC-1,
   If 1:1 protection is required, then two
   IFA6-D3U1 are required per three DS3 or
   EC-1 in slots #6X103 & #6X104, #6X105 &
   #6X106, #6X107 & #6X108, #6X110 &
   #6X111, #6X112 & #6X113, and #6X114 &
   #6X115, as needed.
   If 1:1 protection is not required, then
   one IFA6-D3U1 is required per three DS3
   or EC-1 in any of slots #6X103 through
   #6X108, and #6X110 through #6X115, as
   needed.
  If more than 18 DS3/EC-1 are required, then
  one IFA6-D3U1 is required per three DS3 or
  EC-1 in slots #6X103, #6X104, #6X105, #6X106,
  #6X107, #6X108, #6X110, #6X111, #6X112,
  #6X113, #6X114, and #6X115, as needed.
Shelf (Shelf Assembly)
This is a modular shelf which houses the plug-in units,
and which has four sections (Transport, Tributary,
Switch, and Management).
Features:
 Modular design
 Management section of five slots plus two for
 timing control
 Switch section of six slots
 Four Transport interface slots (two are optional
 tributary slots)
 Twelve Tributary interface slots plus two optional
 Transport slots
 Integrated fan shelf that houses four FAN2 units
Usage:
One shelf is required per network element.
Slot Assignments:
Not applicable
Configuration Rules:
One shelf is required.
FAN2 (Fan Unit)
This fan unit is designed to maintain temperatures in
the shelf within an acceptable range. Each shelf TABLE 3-continued

COMPONENT INFORMATION PACKAGE receives 4 removable fans, providing forced cooling for
the plug-in units in the shelf.
Features:
    Plug-in unit removal/replacement without traffic
    interruption
    Problem notification via alarm system
Usage:
Four FAN2 units are required per shelf.
Slot Assignments:
Not applicable (the FAN2 units are installed on top of
the shelf).
Configuration Rules:
Four FAN2 units are required at the top of the shelf.
Air Filter
Air filter for FAN2, which purifies the air flowing
through the fan system.
Features:
    Replaceable air filter
Usage:
One air filter is required per shelf.
Slot Assignments:
Not applicable
Configuration Rules:
One air filter is required per shelf.
Heat Shield
The heat shield routes the airflow through the shelf
and out the heat shield. The FAN2 units push the air
through the heat shield and route it out of the rack.
Features:
    Passive heat baffle
Usage:
One heat shield is required per shelf.
Slot Assignments:
Not applicable (The heat shield is installed above the
FAN2 units).
Configuration Rules:
One heat shield is required per shelf above the FAN2
units.
Circuit Breaker Panel
Circuit Breaker Panel (CBP)
The circuit breaker panel (CBP) serves as the power
distribution, alarm collection, and output center for
the system. The CBP provides eight circuit breaker
slots (four A and four B) designed to support circuit
breakers ranging from 10 to 40 amperes.
Features:
    Eight circuit breaker slots
    Dual –48 Vdc A and B inputs and test points
    Screw-type power connector and wire-wrap block for
    critical, major, and minor alarms, and tripped
    circuit breaker/fuse and alarm outputs
Usage:
One circuit breaker panel is provided per rack, where
needed.
Slot Assignments:
Not applicable
Configuration Rules:
One circuit breaker panel is provided per rack, where
needed.
Circuit Breaker Kit
Circuit Breaker Kit (30 A circuit breakers)
The CB kit includes the necessary circuit breakers for
the specified standard rack configuration.
Features:
    30 A circuit breakers
Usage:
One circuit breaker kit is required per shelf.
Slot Assignments:
Not applicable
Configuration Rules:
One circuit breaker kit is required per shelf.
DS3 Extended Shelf
DS3 EXTSHELF - DS3 extension panel (or shelf), with
            cable.
The DS3 extended shelf provides an additional 18 DS3
unprotected ports (BNC connectors) per shelf. The
connection between the DS3 extension panel and the TABLE 3-continued

COMPONENT INFORMATION PACKAGE shelf is made through fabricated cabling provided with
the DS3 extension panel.
Features:
    Extension of connection for DS3 interface units
    Addition of BNC connectors for additional 18
    unprotected DS3 interfaces
Usage:
One DS3 extended shelf is required when more than 18
DS3 interface units are specified.
Slot Assignments:
Not applicable
Configuration Rules:
If more than 18 DS3 interface units are required, then
one DS3 extended shelf is required.
DS3 Spare Cable
DS3 CAB1    - DS3 extension panel spare cable.
This is a spare cable which is identical to the cable
that comes standard with the DS3 extended shelf.
Usage:
One DS3 spare cable is provided where specified.
Slot Assignments:
Not applicable
Configuration Rules:
One DS3 spare cable is provided where specified.

In FIG. 7, the next step is step 193, where each component is categorized with respect to each of the four component classes discussed above, in particular the three component classes identified in TABLE 1, as well as the ancillary component class. With respect to the multiplexer apparatus 10 of FIG. 1, and the seventeen components thereof which are identified in the inventory list of TABLE 2, the resulting classification is shown in TABLE 4.

TABLE 4

CLASSIFICATION OF COMPONENTS

| Class | Component |
| --- | --- |
| 1 | Shelf |
| | FAN2 |
| | Air Filter |
| | Heat Shield |
| | MPA6-CPU1 |
| | DCA6-MEM1 |
| | HSA6-AHB1 |
| | TCA6-ST31 |
| | SFA6-SF11 |
| 2 | IFA6-xxx1 (transport) |
| 3 | APA6-AP21 |
| | AFA6-AF21 |
| | IFA6-xxx1 (tributary) |
| | IFA6-D3U1 (tributary) |
| | DS3 ExtShelf |
| Ancillary | CBP |
| | CB Kit |
| | DS3 CAB1 |

The classification in TABLE 4 can be derived from the configuration rules set forth in TABLE 3 for each component. For example, as to each of the nine components listed in Class 1 of TABLE 4, it will be noted from the corresponding configuration rules in TABLE 3 that every product or version of the multiplexer apparatus 10 unconditionally requires exactly the same specific quantity and type of each of these components.

With respect to item 17 in TABLE 2 (IFA6-xxx1), it will be noted that the configuration rules in TABLE 3 separately address the situation in which this component is used in the transport section 41 (FIG. 5), and the situation in which this component is used in the tributary section 46. As a result, it will be noted that this component appears twice in TABLE 4, in particular in Class 2 with respect to its use in the transport section, and again in Class 3 with respect to its use in the tributary section.

With respect to use in the transport section 41, item 17 in TABLE 2 is the only component that is allowed to be used for transport purposes. Consequently, at least one is always required, although the quantity and type may vary from product to product, as evident from the associated configuration rules in TABLE 3. In contrast, with respect to Class 3, it is permissible to implement tributary interfaces using item 16 in TABLE 2 (DS3/EC-1 interfaces), or item 17 (OC-12 or OC-3 interfaces). Thus, a product can be configured in which the tributary section is implemented using only item 16 from TABLE 2, rather than item 17. Consequently, with respect to the tributary section 46, item 17 is not required in every valid product, and use of this component for the tributary section is therefore categorized in Class 3 rather than in Class 2.

Just as the tributary section 46 may be implemented using only item 16 of TABLE 2 and not item 17, the tributary section 46 may conversely be implemented using only item 17 and not item 16. Thus, item 16 is also not required in every product, and is thus listed in Class 3.

An ATM interface, which can be implemented using the components identified as items 14 and 15 in TABLE 2, is an option which does not need to be present in every product. Consequently, these two components are classified in Class 3. Finally, the DS3 extension shelf 121 (FIG. 6), which is item 7 in TABLE 2, is only provided in products where more than eighteen DS3 ports are needed. Therefore, as shown in TABLE 4, the DS3 extension shelf is classified in Class 3.

As discussed above, the CBP (item 5 in TABLE 2), the CB kit (item 6 in TABLE 2), and the spare cable DS3 CAB1 (item 8 in TABLE 2) are not physically part of the multiplexer apparatus 10 in any configuration. Each may be selectively provided with or omitted from any product version of the multiplexer apparatus 10, depending on the particular situation. For these reasons, they are treated as ancillary components, and are shown as such in TABLE 4.

In the disclosed embodiment, it is a target or goal that, based on the classification of components set forth in TABLE 4, the total percentage of components corresponding to both of Classes 1 and 2 should be at least 40% of the total number components, where the quantities of these components reflect the maximum number of components that might be present in different products that are respective configurations of the multiplexer apparatus 10. In this regard, TABLEs 5 through 10 each address this for a respective different product which is a configuration of the apparatus 10.

In more detail, TABLEs 5–7 represent configurations where the transport interfaces are OC-12 interfaces, and TABLEs 8–10 represent configurations where the transport interfaces are OC-3 interfaces. TABLEs 5 and 8 represent a terminal configuration (FIG. 2), TABLEs 6 and 9 represent a UPSR configuration (FIG. 3) and TABLEs 7 and 10 represent a linear ADM configuration (FIG. 4). The configurations in TABLES 5–10 each use the maximum number of components, including the maximum number of circuit cards that implement tributary interfaces. It will be noted that, in each of the configurations shown in TABLEs 5–10, the sum of the percentages for Classes 1 and 2 ranges from 46% to 51% of the total number of components, and thus all six configurations meet the 40% target discussed above. Compliance with the target is advantageous, but not mandatory.

In a situation where the target is not initially met, it may be possible to adjust the initial classification so as to achieve compliance with the 40% target. For example, there may be a component in Class 3 which would not normally be required in each product, but which could be shifted to Class 2 by making it a requirement in each product. In the disclosed embodiment, however, and as evident from TABLEs 5–10, no such adjustment is needed.

TABLE 5

OC-12 TERMINAL

| CLASS | CARDS | CARD COUNT | % |
|---|---|---|---|
| 1 | 1 MPA6-CPU1<br>1 DCA6-MEM1<br>1 HSA6-AHB1<br>2 TCA6-ST31<br>2 SFA6-SF11<br>1 Shelf<br>4 FAN2<br>1 Air Filter<br>1 Heat Shield | 14 | 40% |
| 2 | 4 IFA6 (transport) | 4 | 11% |
| 3 | 12 IFA6 (tributary)<br>2 AFA6<br>2 APA6<br>1 DS3 ExtShelf | 17 | 49% |

35 Total Cards

TABLE 6

OC-12 UPSR

| CLASS | CARDS | CARD COUNT | % |
|---|---|---|---|
| 1 | 1 MPA6-CPU1<br>1 DCA6-MEM1<br>1 HSA6-AHB1<br>2 TCA6-ST31<br>2 SFA6-SF11<br>1 Shelf<br>4 FAN2<br>1 Air Filter<br>1 Heat Shield | 14 | 40% |
| 2 | 2 IFA6 (transport) | 2 | 6% |
| 3 | 14 IFA6 (tributary)<br>2 AFA6<br>2 APA6<br>1 DS3 ExtShelf | 19 | 54% |

35 Total Cards

TABLE 7

OC-12 LINEAR ADM

| CLASS | CARDS | CARD COUNT | % |
|---|---|---|---|
| 1 | 1 MPA6-CPU1<br>1 DCA6-MEM1<br>1 HSA6-AHB1<br>2 TCA6-ST31<br>2 SFA6-SF11<br>1 Shelf<br>4 FAN2<br>1 Air Filter<br>1 Heat Shield | 14 | 40% |
| 2 | 4 IFA6 (transport) | 4 | 11% |
| 3 | 12 IFA6 (tributary) | 17 | 49% |

TABLE 7-continued

OC-12 LINEAR ADM

| CLASS | CARDS | CARD COUNT | % |
|---|---|---|---|
|  | 2 AFA6 |  |  |
|  | 2 APA6 |  |  |
|  | 1 DS3 ExtShelf |  |  |
|  | 35 Total Cards |  |  |

TABLE 8

OC-3 TERMINAL

| CLASS | CARDS | CARD COUNT | % |
|---|---|---|---|
| 1 | 1 MPA6-CPU1 | 14 | 40% |
|  | 1 DCA6-MEM1 |  |  |
|  | 1 HSA6-AHB1 |  |  |
|  | 2 TCA6-ST31 |  |  |
|  | 2 SFA6-SF11 |  |  |
|  | 1 Shelf |  |  |
|  | 4 FAN2 |  |  |
|  | 1 Air Filter |  |  |
|  | 1 Heat Shield |  |  |
| 2 | 4 IFA6 (transport) | 4 | 11% |
| 3 | 12 IFA6 (tributary) | 17 | 49% |
|  | 2 AFA6 |  |  |
|  | 2 APA6 |  |  |
|  | 1 DS3 ExtShelf |  |  |
|  | 35 Total Cards |  |  |

TABLE 9

OC-3 UPSR

| CLASS | CARDS | CARD COUNT | % |
|---|---|---|---|
| 1 | 1 MPA6-CPU1 | 14 | 40% |
|  | 1 DCA6-MEM1 |  |  |
|  | 1 HSA6-AHB1 |  |  |
|  | 2 TCA6-ST31 |  |  |
|  | 2 SFA6-SF11 |  |  |
|  | 1 Shelf |  |  |
|  | 4 FAN2 |  |  |
|  | 1 Air Filter |  |  |
|  | 1 Heat Shield |  |  |
| 2 | 2 IFA6 (transport) | 2 | 6% |
| 3 | 14 IFA6 (tributary) | 19 | 54% |
|  | 2 AFA6 |  |  |
|  | 2 APA6 |  |  |
|  | 1 DS3 ExtShelf |  |  |
|  | 35 Total Cards |  |  |

TABLE 10

OC-3 LINEAR ADM

| CLASS | CARDS | CARD COUNT | % |
|---|---|---|---|
| 1 | 1 MPA6-CPU1 | 14 | 40% |
|  | 1 DCA6-MEM1 |  |  |
|  | 1 HSA6-AHB1 |  |  |
|  | 2 TCA6-ST31 |  |  |
|  | 2 SFA6-SF11 |  |  |
|  | 1 Shelf |  |  |
|  | 4 FAN2 |  |  |
|  | 1 Air Filter |  |  |
|  | 1 Heat Shield |  |  |

TABLE 10-continued

OC-3 LINEAR ADM

| CLASS | CARDS | CARD COUNT | % |
|---|---|---|---|
| 2 | 4 IFA6 (transport) | 4 | 11% |
| 3 | 12 IFA6 (tributary) | 17 | 49% |
|  | 2 AFA6 |  |  |
|  | 2 APA6 |  |  |
|  | 1 DS3 ExtShelf |  |  |
|  | 35 Total Cards |  |  |

Referring again to FIG. 7, the next step according to the invention, at block 196, is to develop criteria sets. In the disclosed embodiment, each class of components is handled separately. Beginning with Class 1, and as discussed above, the components of Class 1 are required in each product, and do not vary in quantity or type from product to product. Stated differently, every valid product includes precisely the same combination of components from Class 1. Consequently, no criteria are needed to differentiate between different combinations of components from Class 1. Thus, there is no criteria set associated with Class 1.

Turning to Class 2, and as evident from TABLE 4, the disclosed embodiment has only has one component in Class 2, which is the IFA6-xxx1 component (when used as a transport interface rather than a tributary interface). The configuration rules in TABLE 3 for this component can be examined with respect to the portions thereof that relate to use of IFA6-xxx1 for transport or line interfaces. This reveals that there are four criteria which determine the quantity and type of this component that will be present in any valid product configuration. The first such criteria is the speed at which the transport interfaces will operate, or in other words whether an OC-12 or OC-3 interface is used. The second criteria is the type of network element which is to be implemented by the product, and in particular whether the product is to function as a terminal network element (FIG. 2), a UPSR network element (FIG. 3), or a linear ADM network element (FIG. 4). The third criteria is the reach or length of the optical fibers associated with the transport interfaces, and in particular whether these fibers will have a short reach or an intermediate to long reach. The fourth criteria is whether or not each of the transport interfaces will be a protected interface. These four criteria collectively make up the criteria set for Class 2.

Turning now to Class 3, TABLE 4 shows that there are five components in Class 3. Examination of the configuration rules in TABLE 3 for these five components reveals five criteria that identify which combination of Class 3 components should be present in any particular product that is a valid configuration of the multiplexer apparatus 10 of FIG. 1. One of these criteria overlaps with the criteria discussed above for Class 2. In particular, the first criteria for Class 3 is the network element type, or in other words whether the product is to function as a terminal network element, a UPSR network element, or a linear ADM network element.

The second criteria for Class 3 is whether there is to be a data interface, or in other words ATM switching capability. The third criteria is the configuration of tributary interfaces, including the number and type of tributary interfaces, where the available types include OC-12, OC-3, and DS3/EC-1. The fourth criteria is whether or not protection capability is to be provided for each of the tributary interfaces. The fifth criteria is the reach associated with the tributary interfaces, and in particular whether each of the tributary interfaces should have a short reach or an intermediate to long reach.

The final criteria set relates to the components in the ancillary class. As evident from TABLE 4, the ancillary class in the disclosed embodiment includes three components. As discussed above, these three components are not an integral physical part of the multiplexer apparatus 10, and each may be optionally included in or excluded from any particular product which is a valid configuration of the multiplexer apparatus. Thus, in the disclosed embodiment, each of the three components has its own simple criteria, reflecting whether or not the purchaser happens to want that particular component in association with a given product.

Referring again to FIG. 7, block 197 represents the next step, which is to prepare a flowchart that diagrammatically sets forth the various criteria identified in block 196, and that identifies the respective combination of components associated with each valid state or combination of criteria. When the step of block 197 is carried out for the multiplexer apparatus 10 shown in FIG. 1, the result is the flowchart shown in FIG. 8. FIG. 8 is actually composed of several related figures which each show a portion of the overall flowchart, but for convenience and clarity they are all referred to collectively herein as FIG. 8.

To further facilitate convenience and clarity, the flowchart of FIG. 8 includes seven nodes 201–207 at various locations, which do not represent functional capability, but instead are provided solely to facilitate an explanation of the flowchart. In particular, the portion of the flowchart between nodes 201 and 202 represents the portion that determines the combination of Class 1 modules which is to be included in the product. From node 202, flow will proceed until it reaches either the node 203 or the node 204, and the portion of the flowchart between node 202 and nodes 203 and 204 effects identification of the combination of Class 2 components which is to be included in the product that is being configured. From node 203 or node 204, flow can continue along one of various paths until it reaches either the node 205 or the node 206. The portion of the flowchart between nodes 203–204 and nodes 205–206 effects identification of the combination of Class 3 components which is to be included in the product that is being configured. From node 205 or node 206, flow will proceed until it reaches node 207, which is at the end of the flowchart. The portion of the flowchart between nodes 205–206 and node 207 effects identification of the combination of components from the ancillary class which will be included in the product that is being configured.

Turning now in more detail to the flowchart, and as mentioned above, the portion of the flowchart between nodes 201 and 202 identifies the combination of Class 1 components which is to be included in any particular product. By definition, as set forth in TABLE 1, this combination is exactly the same for every product which is a valid configuration of the multiplexer apparatus 10 of FIG. 1. Consequently, this portion of the flowchart includes a single block 212, which sets forth the precise combination of components from Class 1 that are to be included in every product.

Turning to the components from Class 2, and as mentioned above, the portion of the flowchart between node 202 and nodes 203–204 effects identification of the combination of Class 2 components which will be included in the product that is being configured. In this regard, one of the criteria discussed above for Class 2 is the network element (NE) type for the product, and this is determined at block 214. Another Class 2 criteria discussed above is the speed of the transport interfaces, or in other words whether they are OC-12 or OC-3 interfaces. This is determined at one of three blocks 216–218. A further Class 2 criteria discussed above is whether or not protection is to be provided for the transport interfaces. This is determined at one of four blocks 221–224. The last criteria discussed above for Class 2 is whether the reach or length of the optical fibers for the transport interfaces is to be a short reach or an intermediate to long reach. This is determined at one of ten blocks 226–235.

Depending on the decisions made as the configuration flow passes successively through several of the blocks 214, 216–218, 221–224 and 226–235, the flow will end up at one of twenty blocks 241–260, which each set forth a respective combination of Class 2 components that is to be installed in the product being configured, in order to meet the criteria specified by the purchaser. From each of the twenty blocks 241–260, the configuration flow proceeds to either node 203 or node 204.

Focusing now on the portion of the flowchart which appears between nodes 203–204 and nodes 205–206, this portion determines the particular combination of Class 3 components which will be included in the product. As discussed above, one criteria for Class 3 is shared with Class 2. This criteria is the network element type for the resulting product. This criteria has already been taken into account at block 214. The decision made at block 214 determines whether the configuration flow eventually arrives at node 203 or node 204. In particular, if the configuration flow arrives at node 203, it is because a determination was made at block 214 that the network element type is either a terminal or UPSR. Alternatively, if the configuration flow arrives at block 204, it is because a determination was made at block 214 that the network element type is a linear ADM. Thus, although this particular criteria is not expressly referred to after blocks 203 and 204, it is being taken account for purposes of Class 3 components.

Another criteria discussed above for Class 3 is whether the product is to include an ATM interface. This is determined at one of two blocks 271 and 272 in FIG. 8. If ATM interface capability is to be provided, then the configuration flow proceeds to one of two blocks 273 and 274, which each specify the combination of Class 3 components that will be included in the product to provide ATM interface capability. On the other hand, if it is determined at block 271 or block 272 that ATM interface capability is not required, then the configuration flow skips the associated block 273 or 274. In either case, the configuration flow ultimately proceeds to one of blocks 277 or 278.

Another criteria discussed above with respect to Class 3 involves the configuration of tributary interfaces, and in particular the type and quantity of tributary interfaces. In FIG. 8, this is evaluated at blocks 277 and 278, and then the configuration flow branches in dependence on whether the specified type of tributary interface is an OC-12 interface, an OC-3 interface, or an EC-1/DS3 interface.

Still another criteria discussed above with respect to Class 3 is whether protection is to be provided for tributary interfaces. This is evaluated next, in one of six blocks 281–286. The remaining criteria discussed above with respect to Class 3 is the length or reach of the optical fibers associated with the tributary interfaces, and in particular whether they have a short reach or an intermediate to long reach. Where this criteria is relevant, it is evaluated at one of eight blocks 291–298. Alternatively, where appropriate, blocks 302 and 303 revisit an issue that was addressed in blocks 277 and 278, namely the number of DS3 tributary interfaces, and in particular whether more than eighteen DS3 interfaces are to be provided in the product.

Based on various decisions made in blocks 214, 277–278, 281–286, 291–298, and 302–303, the configuration flow ultimately arrives at one of twenty-two blocks 311–332, which each set forth a respective combination of Class 3 components. This is in addition to the Class 3 components, if any, which were added in blocks 273–274 in order to provide ATM interface capability. From each of the blocks 311–332, the configuration flow ultimately proceeds to one of the two nodes 205 and 206.

As discussed above, the portion of the flowchart between nodes 205–206 and node 207 determines the extent to which ancillary components will be provided with the product. In more detail, the configuration flow only arrives at node 206 if the DS3 extended shelf 121 is being included in the product in order to provide extra DS3 interfaces. As discussed above, a corresponding cable 122 is automatically provided with the shelf 121, but the purchaser is given the option of ordering an identical additional cable, which serves as a spare. Consequently, in the flowchart of FIG. 8, a determination is made at block 337 regarding whether the customer wants a spare cable 122 with the product. If so, then the spare cable is included with the product, as indicated at block 338. Otherwise, block 338 is skipped.

Whether or not the configuration flow passes through block 338, it ultimately reaches block 343, where a CB Kit, or in other words a set of circuit breakers, is unconditionally included with the product. In the disclosed embodiment, a decision was made that circuit breakers would be shipped with every product, and this is reflected in the associated configuration rules in TABLE 3. If the product is used with an existing circuit breaker panel, the circuit breakers can be used in that panel. Alternatively, if the customer elects to purchase the Circuit Breaker Panel (CBP) 116 with the product, the circuit breakers from the CB Kit 117 can be used in the CBP 116.

The configuration flow then proceeds to block 347, where a determination is made regarding whether or not the customer wants the CBP 116 with the product. If so, then the CBP is associated with the product at block 348. Otherwise, block 348 is skipped. In either case, the configuration flow ultimately arrives at node 207, which effectively represents the end of the configuration flow.

It will be recognized that, given the flowchart of FIG. 8, it would be straightforward to implement this flowchart in a computer, where the diamond-shaped blocks represent questions presented to a purchaser, and the rectangular blocks identify the components which are to be included in the product being configured, as a function of the answers given by the purchaser to the questions. The questions may be presented dynamically and in sequence as the computer proceeds through the flow sequence represented by the flowchart of FIG. 8. Alternatively, the questions may all be presented and answered in advance, and the answers then stored, before the computer begins the flow sequence represented by FIG. 8. The computer would then carry out the flow sequence of FIG. 8, referring to the stored answers each time it reached one of the diamond-shaped decisional blocks.

It will be evident from the foregoing discussion and from FIG. 8 that a purchaser is presented with a short set of questions that are relatively easy to answer, because they relate to functional characteristics which the purchaser wants the resulting product to have in the purchaser's system. For example, the purchaser can readily specify the type of network element needed, the speed for transport interfaces, the reach for transport interfaces, whether protection is required for transport interfaces, whether ATM interface capability is needed, the type and quantity of tributary interfaces, the reach of tributary interfaces, and whether protection is needed for tributary interfaces.

In order to provide this information, the customer needs little or no technical knowledge regarding the internal considerations of the product itself. For example, the customer does not need to be familiar with the configuration of slots 131–159 within the shelf 101, does not need to know which slots are half-height and which are full-height, does not need to be familiar with various circuit cards that can be inserted into the slots, does not need to know which cards must go in a half-height slot and which must go in a full-height slot, and so forth.

The product configuration technique according to the present invention can also be considered from a mathematical perspective. In this regard, for a given component, the total quantity required and the number of types of that component determine the total number of possible combinations for that component. This total number can be expressed mathematically. In particular, where each type in the combination is different, such that there is no duplication, the root formula for determining possible combinations of components is as follows:

$$^nC_x = n!/(x!*(n-x)!),$$

where x is the quantity required, and n is the number of types of the component.

When duplication occurs, or in other words where a given component can be used more than once, iterations of the formula are used. That is, all mixtures of the same type and different types must be considered in order to sum the possible combinations. As an example, assume that a given component has four types (n=4) and can be used in any quantity of one, two or four (x=1, 2 or 4).

For a quantity of one (x=1), there will be only one type utilized for any combination. Therefore the standard combination formula applies:

$$^4C_1 = n!/(x!*(n-x)!) = 4!/(1!*(4-1)!) = 4*3*2*1/(1*3*2*1) = 4$$

For a quantity of two of the given component, consideration must be given to both a situation where the two cards are the same type, and a situation where the two cards are different types:

A) If the two cards are different types, then the quantity is considered to be two for the formula (x=2), as follows:

$$^4C_2 = n!/x!*(n-x)!) = 4!/(2!*2!) = 4*3*2*1/(2*1*2*1) = 6$$

B) If the two cards are the same type, then the quantity is considered to be one for the formula (x=1), as follows:

$$^4C_1 = n!/(x!*(n-x)!) = 4!/(1!*(4-1)!) = 4*3*2*1/(1*3*2*1) = 4$$

Thus, for two cards of the given component, the total number of possible combinations is 10, determined by summing the numbers calculated separately above for the two different situations (6+4=10).

For a quantity of four, the possibilities of four of only one type (all the same), four of three types, four of two types, and four of four types (all different) must be considered.

A) For four of only one type (all the same):

$$^4C_1 = 4!(1!*(4-1)!) = 4$$

B) For four of two types, $^4C_2$ is multiplied by three, because there are three possible groupings of two types out of the total of four types.

$$3*^4C_2 = 4!(2!*(4-2)!) = 3*6 = 18$$

C) For four of three types, $^4C_3$ is multiplied by three, because again there are three possible groupings of three types out of the total of four types.

$$3*^4C_3 = 4!(3!*(4-3)!) = 3*4 = 12$$

D) For four of four types (all different):

$$^4C_4 = 4!(4!*(4-4)!) = 1$$

The combination for a quantity of four totals 35, and is obtained by summing the four numbers calculated separately above (4+18+12+1=35). With respect to the given component used for this example, the total number of possible combinations for all of the allowable quantities of 1, 2, and 4 have been separately calculated above as 4, 10 and 35, respectively. The total number of possible combinations for all possible quantities is thus 49, determined by summing all of these separately determined numbers (4+10+35=49).

The given component just discussed, which has four types (n=4), and which can used in a quantity of 1, 2 or 4 (x=1, 2 or 4), corresponds directly to the only component of the disclosed embodiment which is in Class 2, namely the IFA6 component (with respect to its use for transport interfaces). FIG. 9 is a chart providing information regarding the components of the disclosed embodiment which correspond to Class 2, and FIG. 9 thus lists only a single component. As evident from the foregoing discussion, the total number of mathematical combinations which are possible for this component is 49, and this is shown in the second column of the chart in FIG. 9. The remaining columns in FIG. 9 show how engineering considerations or "rules", in combination with the criteria set associated with Class 2, are sufficient to define a mapping between each valid product and a valid combination of Class 2 components. In this regard, a limitation imposed by engineering considerations is that, although there are four types of the IFA6 component which can be used for transport interfaces, these types are not mixed within any given product. In other words, only one type is used in any given product, in a quantity of either one, two or four. Thus, for each of the four types, there are three possible configurations in terms of quantity (one, two or four), or in other words a total of twelve valid combinations of Class 2 components. Thus, even though the total number of possible combinations has been determined mathematically to be 49, engineering rules reduce the number of valid combinations from 49 to 12, and 12 therefore appears in the column of FIG. 9 entitled "Engineering Rules".

The criteria set for the Class 2 components can then be used to determine which of these twelve valid combinations of Class 2 components should be used in any particular product. The remaining columns in FIG. 9 represent the various criteria (discussed above) which are in the criteria set for Class 2 components. Working from left to right through the columns in FIG. 9 which represent the criteria set, the first column corresponds to the criteria identifying the type of network element. This criteria has the effect of reducing the number of valid combinations to either eight or four, depending on the particular type of network element specified, as indicated in the column in FIG. 9.

The next column corresponds to the criteria of transport interface rate or speed. Specifying the speed or rate for the transport interfaces has the effect of limiting the number of valid combinations to four, as indicated in FIG. 9. Then, with reference to the next column, specifying whether protection is to be provided for transport interfaces effects a reduction in the number of valid combinations from four to two. Next, specifying the reach for transport interfaces reduces the possible choices to one of the twelve valid combinations, as indicated in the right column of FIG. 9.

Summarizing, the engineering rules specify that, of the total possible mathematical combinations of 49, only 12 are valid combinations for use in products, and the criteria set for Class 2 components is adequate to guarantee that the proper one of these twelve valid combinations will be accurately chosen for purposes of configuring any specific product.

FIG. 10 shows a similar analysis for the components in Class 3. FIG. 10 is generally similar to FIG. 9, and therefore not discussed separately in detail.

Engineering rules of the type discussed above reduce the number of possible combinations by effectively combining components into subcombinations, referred to as component sets. In this regard, and as a different example, a product which required a multiplexer component might also always require a demultiplexer component. If so, then the multiplexer and demultiplexer components would together form a component set. The criteria sets discussed above, which may also be referred to as business rules, create configurations from the component sets and the components, in order to form products.

In the disclosed embodiment, and as evident from the foregoing discussion of the flowchart of FIG. 8, the criteria set for Class 2 components is applied first, followed by the criteria set for Class 3 components, and then the criteria set for ancillary components. However, two or more of these criteria sets for respective classes can be collectively viewed as a combined criteria set, and the components from each of the corresponding classes can be collectively viewed as a component group.

The multiplexer apparatus 10 of FIG. 1 is from the field of telecommunications, and in the context of this exemplary apparatus and field, the questions corresponding to all criteria sets are presented in an order which generally reflects the following hierarchy:

1) Questions that have network architecture or topology implications (such as the network element type).
2) Questions that have network or global implications (such as the transport speed).
3) Questions that have nodal or local implications.
4) Questions that have span implications (such as the reach).
5) Questions that have drop capacity implications (such as the number and type of tributaries).
6) Questions that have ancillary equipment implications (such as whether to provide a circuit breaker panel).

However, it will be recognized that the items in this hierarchy are specific to an apparatus in the telecommunications field, such as that shown at 10 in FIG. 1. For other types of products and/or other fields, the nature and sequence of questions may be different from those which apply to a telecommunications product of the type shown at 10 in FIG. 1.

The present invention provides a number of technical advantages. One such technical advantage is that the invention facilitates generation of a configuration procedure which is purchaser friendly, because it presents a limited number of questions which are easy for a customer to answer, and does not require that the purchaser have any significant technical familiarity with internal engineering considerations and limitations. A further advantage is that the configuration procedure generated according to the invention provides accurate and reliable configuration of products based on the information provided by the customer. Further, the invention ensures that the resulting configuration procedure is capable of reliably and accurately handling every possible configuration of components that represents a valid product. Still another advantage is that, for any given apparatus, the invention facilitates development of a configuration procedure using a methodical approach which significantly reduces the time and effort needed, to develop the configuration procedure.

Although one embodiment of the invention has been disclosed in detail, it will be should understood that various alternations can be made without departing from the scope of the invention. Further, although the foregoing discussion explains how the present invention can be applied in the specific context of a telecommunications apparatus, it will be recognized that the subject matter of the present invention is applicable to a variety of other types of devices.

What is claimed is:

1. A computer implemented method for facilitating configuration of one of a plurality of different products from a set of components which can be selectively combined in different ways to form a plurality of different component combinations that each serves as a respective said product, comprising the steps of:

determining whether each said component in said set corresponds to a first component class involving components that are required in each said product without variation in quantity and type;

determining whether each said component in said set corresponds to a second component class involving components that are required in each said product but that vary among said products with respect to at least one of quantity and type;

determining whether each said component in said set corresponds to a third component class involving components that are present in some but not all of said products, the components corresponding to said second and third component classes collectively forming a component group;

identifying a criteria set having a plurality of different states which each correspond to a respective one of said products;

associating with each said state of said criteria set a definition of a combination of the components from said component group which is present in the corresponding product;

determining whether the total percentage of said components corresponding to both of said first and second component classes represent at least 40% of the total number of said components in each of the products; and responding to a determination that the total percentage of said components corresponding to both of said first and second component classes does not represent at least 40% of the total number of said components in each of the products by effecting an adjustment which causes at least one of said components determined to correspond to said third component class to be treated as corresponding to said second component class rather than said third component class thereby adjusting the definition of the combination of components.

2. A method according to claim 1, wherein said products each have therein one of a plurality of different combinations of the components corresponding to said second component class; and wherein said identifying step includes the steps of:

identifying a criteria subset which is a subset of said criteria set and which has a plurality of different states, each of said products being associated with one of said states of said criteria subset; and associating with each of said states of said initial criteria set a definition of a respective one of said different combinations of components corresponding to said second component class.

3. A method according to claim 1, including the step of configuring said components so that at least one of said components in said component group is available in a plurality of different types.

4. A method according to claim 1, including the steps of:

determining whether each said component in said set corresponds to an ancillary component class involving components that are separate from but related to at least some of said products; and including in said component group said components corresponding to said ancillary class.

5. A method according to claim 1, wherein said identifying step includes the step of identifying a set of questions which correspond to said criteria in said criteria set and which have different combinations of possible answers, each said state of said criteria set corresponding to a respective said combination of answers to said questions.

6. A method according to claim 5, including the step of presenting questions from said set of questions to a person, accepting from the person an answer to each question, and configuring a product based on said answers accepted from the person.

7. A method according to claim 1, wherein each of said products is a telecommunications product having transport interfaces and tributary interfaces, and wherein said identifying step includes the step of including within said criteria set at least one of a network element type, a speed for said transport interfaces, whether said transport interfaces are to be protected, a reach of said transport interfaces, whether ATM interface capability is to be present, a speed for said tributary interfaces, a quantity of said tributary interfaces, whether said tributary interfaces are to be protected, and a reach of said tributary interfaces.

8. A method according to claim 1, including prior to said determining steps the step of generating for each said component respective component information which includes an identification of all types of the component and includes configuration information defining the conditions under which a particular type and quantity of that component are used in each of said products.

9. A method according to claim 8, wherein said step of generating said component information includes the step of taking engineering limitations into account in preparing said configuration information.

10. A method according to claim 1, including after said determining, identifying and associating steps the step of preparing a flowchart which graphically represents a mapping between said different states of said criteria set and said definitions of combinations of the components from said component group.

11. A method according to claim 1, including the step of configuring one of said components which corresponds to said first component class so that it can removably receive therein a plurality of other said components.

* * * * *

UNITED STATES PATENT AND TRADEMARK OFFICE
CERTIFICATE OF CORRECTION

| | | |
|---|---|---|
| PATENT NO. | : 6,915,253 B1 | |
| APPLICATION NO. | : 09/662366 | |
| DATED | : July 5, 2005 | |
| INVENTOR(S) | : Barry L. Chapman | |

It is certified that error appears in the above-identified patent and that said Letters Patent is hereby corrected as shown below:

Column 6, Line 38, after "breaker kit" delete "(CS Kit)" and insert -- (CB Kit) --.
Column 15, Line 47, after "#6X106," delete "#6X017" and insert -- #6X107 --.

Signed and Sealed this

Twenty-sixth Day of December, 2006

JON W. DUDAS
*Director of the United States Patent and Trademark Office*